United States Patent
Saika et al.

(10) Patent No.: US 11,480,291 B2
(45) Date of Patent: *Oct. 25, 2022

(54) CAMERA SYSTEM USING STABILIZING GIMBAL

(71) Applicant: GoPro, Inc., San Mateo, CA (US)

(72) Inventors: Noriaki Saika, Foster City, CA (US); Ryan Harrison, Walpole, NH (US); Joshua Todd Druker, Redwood City, CA (US); Himay Rashmikant Shukla, San Mateo, CA (US); Nenad Uzunovic, San Mateo, CA (US); Edward Gordon Russell, Pacifica, CA (US); Gary Fong, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/140,826

(22) Filed: Jan. 4, 2021

(65) Prior Publication Data
US 2021/0148508 A1    May 20, 2021

Related U.S. Application Data

(63) Continuation of application No. 16/373,958, filed on Apr. 3, 2019, now Pat. No. 10,914,419, which is a
(Continued)

(51) Int. Cl.
*F16M 13/02* (2006.01)
*H04N 5/232* (2006.01)
(Continued)

(52) U.S. Cl.
CPC .......... *F16M 13/02* (2013.01); *B64C 39/024* (2013.01); *B64D 47/08* (2013.01); *F16M 11/041* (2013.01);
(Continued)

(58) Field of Classification Search
CPC .... F16M 13/02; F16M 11/041; F16M 11/121; F16M 11/18; F16M 13/04; B64C 39/024;
(Continued)

(56) References Cited

U.S. PATENT DOCUMENTS

| | | | |
|---|---|---|---|
| 2,362,773 A | 11/1944 | Robinson | |
| 4,752,791 A | 6/1988 | Allred | |

(Continued)

FOREIGN PATENT DOCUMENTS

| | | |
|---|---|---|
| CN | 201477355 | 5/2010 |
| CN | 201535852 U | 7/2010 |

(Continued)

OTHER PUBLICATIONS

3D Robotics, Inc., 'IRIS Operational Manual,' Oct. 16, 2013, 35 Pages, [online] [Retrieved on Apr. 29, 2016] Retrieved from the Internet <URL:https://3dr.com/wp-content/uploads/2013/10/operation-manual-compressed.pdf>.

(Continued)

*Primary Examiner* — James M Pontius
(74) *Attorney, Agent, or Firm* — Young Basile Hanlon & MacFarlane, P.C.

(57) ABSTRACT

Disclosed is an electronic gimbal with camera and mounting configuration. The gimbal can include an inertial measurement unit which can sense the orientation of the camera and three electronic motors which can manipulate the orientation of the camera. The gimbal can be removably coupled to a variety of mount platforms, such as an aerial vehicle, a handheld grip, or a rotating platform. Moreover, a camera can be removably coupled to the gimbal and can be held in a removable camera frame. Also disclosed is a system for allowing the platform, to which the gimbal is mounted, to control settings of the camera or to trigger actions on the camera, such as taking a picture, or initiating the recording (Continued)

of a video. The gimbal can also provide a connection between the camera and the mount platform, such that the mount platform receives images and video content from the camera.

20 Claims, 16 Drawing Sheets

Related U.S. Application Data continuation of application No. 15/841,555, filed on Dec. 14, 2017, now Pat. No. 10,274,129, which is a continuation of application No. 15/307,331, filed as application No. PCT/US2016/028518 on Apr. 20, 2016, now Pat. No. 9,874,308.

(60) Provisional application No. 62/302,170, filed on Mar. 2, 2016, provisional application No. 62/249,879, filed on Nov. 2, 2015, provisional application No. 62/167,241, filed on May 27, 2015.

(51) Int. Cl.

| | |
|---|---|
| H04N 5/225 | (2006.01) |
| F16M 13/04 | (2006.01) |
| B64C 39/02 | (2006.01) |
| B64D 47/08 | (2006.01) |
| F16M 11/04 | (2006.01) |
| F16M 11/12 | (2006.01) |
| F16M 11/18 | (2006.01) |
| G03B 15/00 | (2021.01) |
| G03B 17/56 | (2021.01) |
| G05D 1/00 | (2006.01) |
| H04N 7/18 | (2006.01) |
| H04N 5/77 | (2006.01) |
| H04N 5/783 | (2006.01) |
| H04N 9/82 | (2006.01) |

(52) U.S. Cl.
CPC ........... *F16M 11/121* (2013.01); *F16M 11/18* (2013.01); *F16M 13/04* (2013.01); *G03B 15/006* (2013.01); *G03B 17/561* (2013.01); *G05D 1/0094* (2013.01); *H04N 5/2251* (2013.01); *H04N 5/2328* (2013.01); *H04N 5/23299* (2018.08); *H04N 7/183* (2013.01); *B64C 2201/127* (2013.01); *H04N 5/23203* (2013.01); *H04N 5/23258* (2013.01); *H04N 5/23293* (2013.01); *H04N 5/772* (2013.01); *H04N 5/783* (2013.01); *H04N 9/8205* (2013.01)

(58) Field of Classification Search
CPC .......................... B64C 2201/127; B64D 47/08; G03B 15/006; G03B 17/561; G05D 1/0094; H04N 5/2251; H04N 5/2328; H04N 5/23299; H04N 7/183; H04N 5/23203; H04N 5/23258; H04N 5/23293; H04N 5/772; H04N 5/783; H04N 9/8205
See application file for complete search history.

(56) References Cited

U.S. PATENT DOCUMENTS

| | | | | |
|---|---|---|---|---|
| 6,384,976 B1* | 5/2002 | Ishijima | ............. | H04N 5/23283 |
| | | | | 359/557 |
| 7,876,359 B2 | 1/2011 | Von | | |
| 8,265,808 B2 | 9/2012 | Garrec | | |
| 8,292,215 B2 | 10/2012 | Olm | | |
| 8,434,950 B1* | 5/2013 | Wawro | ................. | G03B 17/561 |
| | | | | 396/419 |
| 8,654,427 B1* | 2/2014 | DeAngelo | ............. | G02B 7/004 |
| | | | | 359/819 |
| 8,989,922 B2 | 3/2015 | Jones | | |
| 9,030,149 B1 | 5/2015 | Chen | | |
| 9,164,506 B1 | 10/2015 | Zang | | |
| 9,264,599 B2 | 2/2016 | Reid | | |
| 9,280,038 B1* | 3/2016 | Pan | .................... | F16M 11/2064 |
| 9,749,544 B2* | 8/2017 | Wang | .................. | G03B 17/561 |
| 10,054,258 B2* | 8/2018 | Wang | ................. | H04N 5/23258 |
| 10,274,129 B2* | 4/2019 | Saika | ..................... | F16M 11/041 |
| 10,914,419 B2* | 2/2021 | Saika | ..................... | F16M 11/18 |
| 2004/0173726 A1* | 9/2004 | Mercadal | .............. | G01C 21/18 |
| | | | | 248/660 |
| 2005/0029398 A1 | 2/2005 | Lowe | | |
| 2005/0185089 A1 | 8/2005 | Chapman | | |
| 2006/0239678 A1 | 10/2006 | Itzkowitz | | |
| 2007/0152116 A1 | 7/2007 | Madsen | | |
| 2009/0003822 A1 | 1/2009 | Tyner | | |
| 2009/0008499 A1 | 1/2009 | Shaw | | |
| 2009/0190916 A1 | 7/2009 | Sharp | | |
| 2009/0257741 A1 | 10/2009 | Greb | | |
| 2012/0233000 A1 | 9/2012 | Fisher | | |
| 2013/0250126 A1* | 9/2013 | Nakamura | ........... | H04N 5/2252 |
| | | | | 348/169 |
| 2014/0263823 A1 | 9/2014 | Wang | | |
| 2015/0097950 A1 | 4/2015 | Wang | | |
| 2015/0207964 A1* | 7/2015 | Bye | ........................ | B64D 47/08 |
| | | | | 348/374 |
| 2015/0219981 A1 | 8/2015 | Roberts | | |
| 2015/0313445 A1 | 11/2015 | Davidson | | |
| 2016/0029105 A1 | 1/2016 | Newman | | |
| 2016/0083110 A1 | 3/2016 | Pan | | |
| 2016/0171330 A1* | 6/2016 | Mentese | ................. | G06V 10/25 |
| | | | | 348/170 |
| 2016/0381271 A1* | 12/2016 | Cheng | ................. | F16M 11/2071 |
| | | | | 348/208.2 |
| 2017/0002975 A1* | 1/2017 | Yang | ................... | F16M 11/2071 |
| 2017/0002976 A1* | 1/2017 | Wang | .................... | F16M 11/126 |
| 2017/0036771 A1* | 2/2017 | Woodman | ............... | B64C 25/54 |
| 2017/0108168 A1* | 4/2017 | Pan | ...................... | G03B 17/561 |
| 2017/0108861 A1* | 4/2017 | Enke | ...................... | G05D 1/106 |
| 2017/0138534 A1* | 5/2017 | Chen | ..................... | F16M 11/18 |
| 2017/0159875 A1* | 6/2017 | Wagner | ................ | G03B 17/563 |
| 2017/0185954 A1* | 6/2017 | McAllister | ............ | H01Q 1/2216 |
| 2017/0192342 A1* | 7/2017 | Liu | ...................... | H04N 5/2253 |
| 2017/0262009 A1* | 9/2017 | Peng | ...................... | G05G 1/01 |
| 2017/0363391 A1* | 12/2017 | Conklin | .................... | F41G 5/14 |
| 2018/0112980 A1* | 4/2018 | Diem | ..................... | G01C 17/38 |
| 2018/0205932 A1* | 7/2018 | Yu | ........................ | H04N 13/383 |
| 2019/0003639 A1* | 1/2019 | Wang | ................... | G03B 17/561 |
| 2022/0163874 A1* | 5/2022 | Chang | .................. | F16M 11/205 |

FOREIGN PATENT DOCUMENTS

| | | |
|---|---|---|
| CN | 102278989 A | 12/2011 |
| CN | 103926940 A | 7/2014 |
| CN | 203757300 U | 8/2014 |
| CN | 104360690 A | 2/2015 |
| CN | 104871082 A | 8/2015 |
| CN | 303348632 S | 8/2015 |
| EP | 0588684 A1 | 3/1994 |
| EP | 0771729 A1 | 5/1997 |
| EP | 1912015 A2 | 4/2008 |
| EP | 2908203 A1 | 8/2015 |

OTHER PUBLICATIONS

DJI Innovations, 'Phantom FC40 User Manual,' Mar. 21, 2014, 31 Pages, [online] [Retrieved on Apr. 29, 2016] Retrieved from the Internet <URL:http://dl.djicdn.com/downloads/phantom_fc40/en/Phantom_FC40_User_Manual_v1.06_en.pdf>.

DJI Innovations, 'Phantom Quick Start Manual V1.2,' 2012, pp. 1-16, [online] [Retrieved on Apr. 29, 2016] Retrieved from the Internet <URL:http://www.rapidonline.com/pdf/595538_an_en_01.pdf>.

(56) References Cited

OTHER PUBLICATIONS

Fantomas, 'Guide to the Phantom 2 Vision & Vision+,' Dec. 4, 2014, 49 Pages, [online] [Retrieved on Apr. 29, 2016] Retrieved from the Internet <URL:http://www.droneflyersxom/wp-content/uploads/2014/12/DJI-Phantom-Vision-Summary-Guide.pdf>.

hobbyking.com, 'NOVA Manual,' 1 page, [online] [Retrieved on Apr. 29, 2016] Retrieved from the Internet <URL:http://www.hobbyking.com/hobbyking/store/uploads/65525800X365809X9.pdf>. (1 page).

Horizon Hobby, Inc., 'Blade 350 QX Instruction Manual,' 2013, 20 Pages, [online] [Retrieved on Apr. 29, 2016] Retrieved from the Internet <URL:http://www.bladehelis.com/ProdInfo/Files/BLH7800-Manual_EN.pdf>.

Johnson, M., 'Heli Pilot Review,' DJI-Innovations, Apr. 2013, pp. 22-26, [online] [Retrieved on Apr. 29, 2016] Retrieved from the Internet <URL:http://www.visual-aerials.com/uploads/3/3/9/9/3399523/visual-aerials_rc_heli_phantom_april2013.pdf>.

Patent Cooperation Treaty, International Search Report and Written Opinion of the International Searching Authority, International Patent Application No. PCT/US2016/028518, dated Sep. 1, 2016, 10 Pages.

PCT International Search Report and Written Opinion for PCT/US2016/028518, dated Sep. 1, 2016, 14 Pages.

PCT Invitation to Pay Additional Fees and, Where Applicable, Protest Fee, PCT/US2016/028518, dated Jun. 13, 2016, 2 Pages.

TBS Discovery, 'TBS Discovery Quadrotor,' ivc.no, Sep. 21, 2014, 33 Pages, [online] [Retrieved on Apr. 29, 2016] Retrieved from the Internet <URL:http://www.team-blacksheep.com/tbs-disco very-manual.pdf>.

Youtube, Video for 'Feiyu-Tech G3 Ultra—3 Axis Gimbal—Review & Testing,' Jun. 12, 2014, 1 Page, can be retrieved from the internet at <URL:https://www.youtube.com/watch?v=WDwRUkjSPZU>.

Extended European Search Report for App. No. EP19212177.0, dated Jun. 24, 2020, 17 pages.

\* cited by examiner

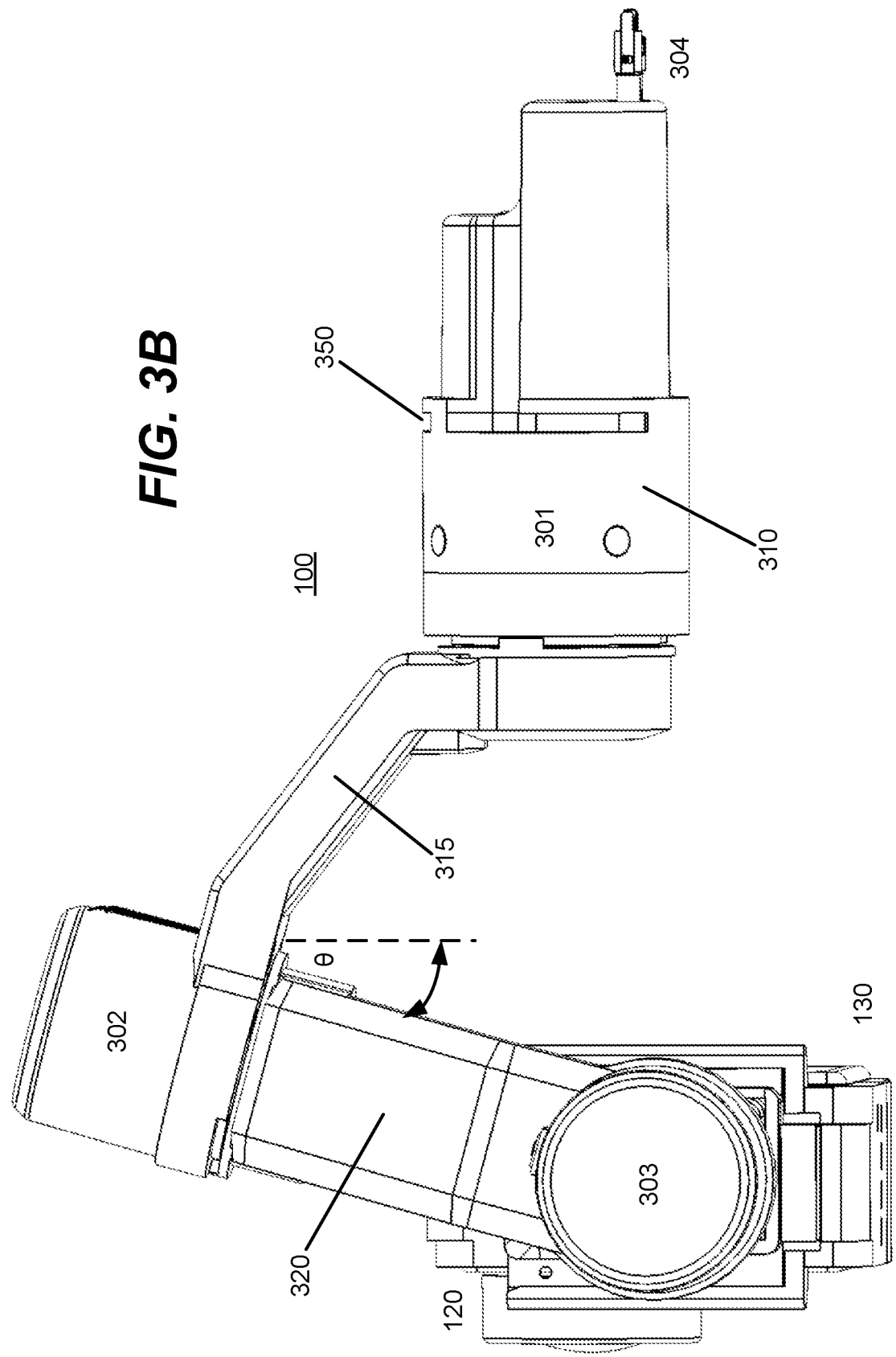

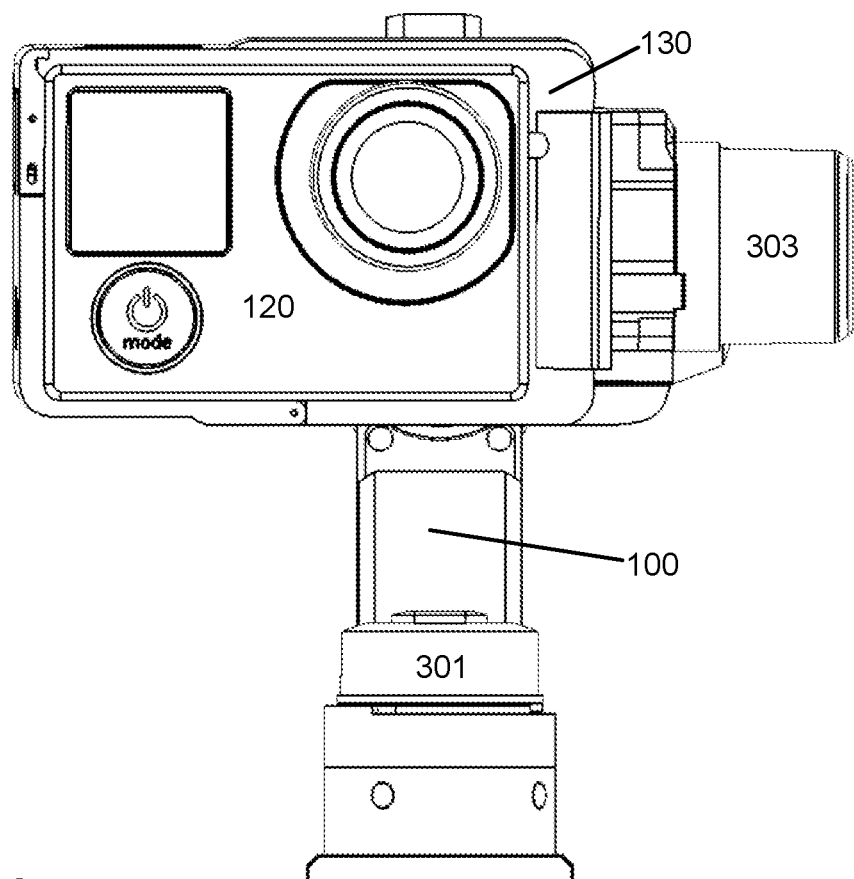
FIG. 6
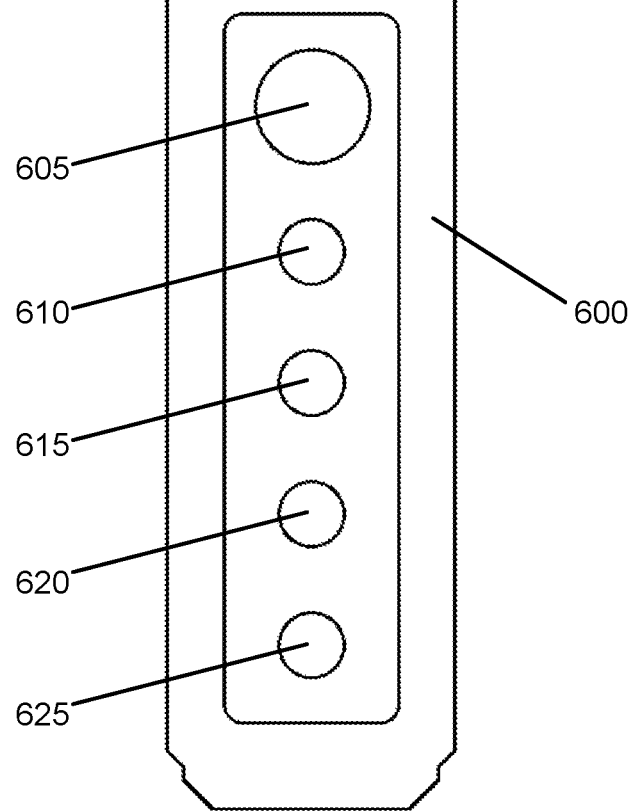

CAMERA SYSTEM USING STABILIZING GIMBAL

CROSS REFERENCE TO RELATED APPLICATION(S)

This application is a continuation of U.S. patent application Ser. No. 16/373,958, filed on Apr. 3, 2019, which is a continuation of U.S. patent application Ser. No. 15/841,555, filed on Dec. 14, 2017, now U.S. Pat. No. 10,274,129, which is a continuation of U.S. patent application Ser. No. 15/307,331 filed on Oct. 27, 2016, now U.S. Pat. No. 9,874,308, which was filed as 35 U.S.C. 371 National Phase Application of International Application No. PCT/US2016/028518 filed on Apr. 20, 2016, which claims the benefit of U.S. Provisional Patent Application No. 62/167,241 filed on May 27, 2015, U.S. Provisional Patent Application No. 62/249,879 filed on Nov. 2, 2015, and U.S. Provisional Patent Application No. 62/302,170 filed on Mar. 2, 2016, all of which the contents are incorporated by reference herein.

BACKGROUND

Field of Art

The disclosure generally relates to the field of camera gimbals and in particular a detachable gimbal that can be connected to a camera and to a variety of mount platforms.

Description of Art

Unstabilized videos taken while flying an aerial vehicle or while moving around at ground level are often so shaky and unstable that they are unusable, not sharable, and unwatchable. The use of an electronic gimbal to stabilize or to set the orientation of a camera is known. A gimbal can be mounted to a platform such as an electronic vehicle. For example, a camera can be mounted via a gimbal to a remote control road vehicle or aerial vehicle to capture images as the vehicle is controlled remotely by a user. A gimbal can allow the recording of stable video even when the platform is unstable.

However, existing stabilization equipment is large, not portable, expensive and can only be used for stabilization. Moreover, most camera gimbals mounted on remote controlled vehicles do not take into a consideration a multitude of issues involving the camera itself in relation to the platform to which it is mounted. These issues include, for example, allowing for a multiplicity of different cameras with different weights and form factors to be mounted to the gimbal, using a securing mechanism that will allow the gimbal to connect to a variety of platforms, preventing or minimizing obstruction of the field of view of the camera by components of the gimbal, allowing communication between the platform and the mounted camera, stabilizing video captured by the camera, and accounting for rotations of the mount platform.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 is a functional block diagram illustrating an example configuration of a camera mounted on a gimbal which is, in turn, mounted to a mount platform.

FIGS. 3A and 3B illustrate an example of a gimbal and camera.

FIG. 6 illustrates a handheld grip coupled to a gimbal and camera.

DETAILED DESCRIPTION

Figure 1:
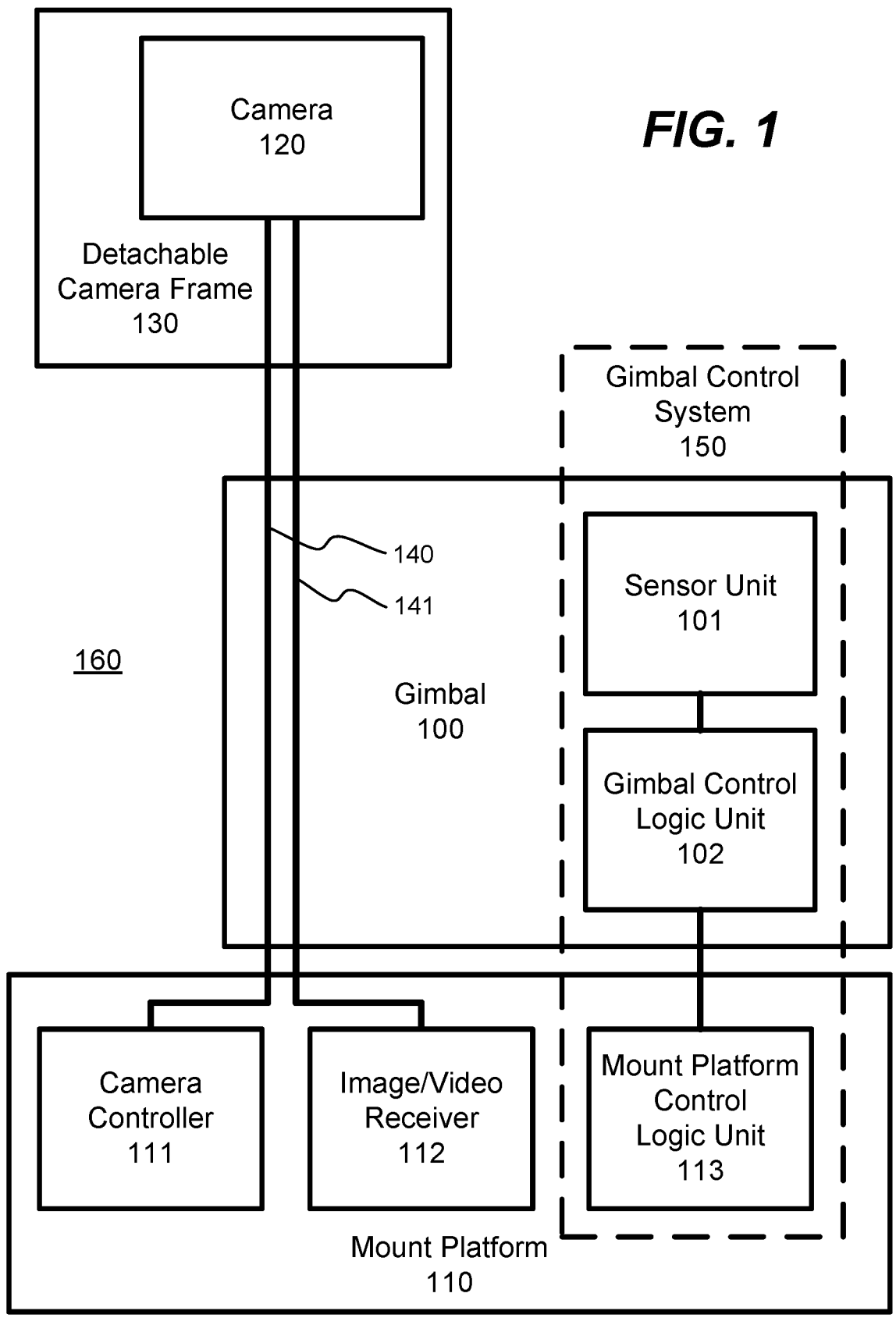

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is an electronic gimbal ecosystem. The ecosystem may include a gimbal for use with a camera and mounting configurations. The gimbal may comprise a pivotable support that can mechanically stabilize an attached device along one or more axes. Particularly, in one embodiment, the gimbal comprises a 3-axis stabilization device for stabilizing a camera along pitch, roll, and yaw axes. The gimbal can include an inertial measurement unit that can sense the orientation of the camera and a number of electronic motors (e.g., three motors) which can manipulate the orientation of the camera. This orientation can correspond to the pitch, roll, and yaw of the camera. The gimbal can be removably coupled to a variety of mount platforms. A mount platform can comprise a structure for attaching to the gimbal or a camera. In an embodiment, the mount platform can comprise a stationary or moveable device that may include a control interface for controlling its own movement, movement of the gimbal, or operation of the camera. For example, mount platforms may include an aerial vehicle, a handheld grip, or a rotating mount. Moreover, the camera can be removably coupled to the gimbal and can be held in a removable camera frame.

Also disclosed is a system for allowing the mount platform to which the gimbal is mounted to control settings of the camera or to trigger actions on the camera, such as taking a picture, or initiating the recording of a video. The gimbal can also provide a connection between the camera and the mount platform, such that the mount platform receives images and video content from the camera.

The mount platform can also control the movement of the gimbal, such that the gimbal performs differently on different mount platforms. A platform-specific behavior of the gimbal can allow the camera mounted to the gimbal to capture images and video in a way best suited to the type of mount platform.

In one embodiment, a mount may connect a gimbal to a mount platform. The mount may include a fixed mount floor that may be rigidly attachable to the mount platform and a fixed mount ceiling that may be rigidly attachable to the mount platform such that a gap may exist between a top surface of the fixed mount floor and a bottom surface of the fixed mount ceiling. A plurality of elastic connectors may protrude from the bottom surface of the fixed mount ceiling. A floating base may have a top surface mechanically coupled to the plurality of elastic connectors and may hang below the fixed mount ceiling and adjacent to the fixed mount floor. A gimbal connection housing may rigidly attach to the floating base. The gimbal connection housing may be removably connectable to the gimbal. A plurality of locking blocks may protrude from the floating base towards the fixed mount floor. A plurality of locking slots in the fixed mount floor may be structured to form a cavity reciprocal to the plurality of locking blocks. At an equilibrium position without a net contact force applied to the floating base in a direction toward the fixed mount floor, a gap may exist between ends of the plurality of locking blocks and corresponding ends of the plurality of locking slots. Furthermore, at a non-equilibrium position when a net contact force is applied to the floating base in the direction towards the fixed mount floor, the ends of the plurality of locking blocks may be flush with the corresponding ends of the plurality of locking slots.

In another embodiment, a dampening base may couple a gimbal to a mount platform. A floating base may include a gimbal connection housing that may be configured to enclose an end of the gimbal. The floating base may be connectable to the mount platform by a plurality of elastic connectors. A locking mechanism may be connected to the floating base. The locking mechanism in a locked position may be capable of rigidly coupling the end of the gimbal to the gimbal connection housing. The locking mechanism in an unlocked position may be capable of allowing the gimbal to be removed from the gimbal connection housing. A plurality of locking blocks may be connected to the floating base. In an absence of a contact force applied to the gimbal pushing the end of the gimbal into the gimbal connection housing, each locking block of the plurality of locking blocks may be held at a first position relative to a corresponding locking slot of a plurality of locking slots in the mount platform. When the contact force is applied to the gimbal, each locking block of the plurality of locking blocks may be moved into a second position wherein each locking block of the plurality of locking blocks may be flush with the corresponding locking slot of the plurality of locking slots.

In another embodiment, an aerial vehicle system may include an aerial vehicle platform and a fixed mount portion that may be rigidly attached to the aerial vehicle platform. A plurality of elastic connectors may protrude from a bottom surface of the fixed mount portion. A floating base may have a top surface mechanically coupled to the plurality of elastic connectors. A plurality of locking blocks may protrude from the floating base. A plurality of locking slots in a side surface of the fixed mount portion may be structured to form a cavity reciprocal to the plurality of locking block. A gimbal connection housing may be rigidly attached to the floating base. A gimbal, may be removably attached to the gimbal connection housing.

In another embodiment, a rotating mount apparatus may comprise a gimbal mount, a motor shaft, an electric motor, and a base. The gimbal mount may include a mechanical coupling for removably coupling to a gimbal. The gimbal mount further may include an electronic connection that may connect to the gimbal. The motor shaft may be connected to the gimbal mount such that rotation of the motor shaft may cause the gimbal mount to rotate. The electric motor may be coupled to the motor shaft to provide torque on the motor shaft. The base may be coupled to the electric motor.

In another embodiment, an electronic gimbal may include a mount connection that may have an electronic mount platform connection configured to connect to a mount platform. A first motor may be connected to the mount connection. The first motor may include a first motor shaft. Torque may be applied by the first motor to rotate the first motor shaft. A second motor may be connected to the first motor shaft. The second motor may include a second motor shaft. Torque may be applied by the second motor to rotate the second motor shaft. A third motor may be connected to the second motor shaft. The third motor may include a third motor shaft. Torque may be applied by the third motor to rotate the third motor shaft. An electronic camera connection may be connected to the third motor shaft. The electronic camera connection may be capable of connecting to a digital camera mounted on the electronic gimbal. An internal data bus may connect the electronic camera connection to the electronic mount platform connection.

In another embodiment, a stabilizing mounting system for a camera may include a handheld grip and an electronic gimbal. The handheld grip may include a shaft, a gimbal connection, and a control button. The gimbal connection may be at an end of the shaft and may include a first securing mechanism and a first electrical interface. The control button may be on the shaft and when activated may cause a control signal to be transmitted via the gimbal connection. The electronic gimbal may comprise a grip connection, a first motor, a second motor, a third motor, a camera connection, and an internal data base. The grip connection may include a second securing mechanism that may removably secure to the first securing mechanism of the handheld grip and a second electrical interface that may communicatively couple to the first electrical interface of the handheld grip. The first motor may be connected to the grip connection. The first motor may apply a first torque to a first motor shaft to cause the first motor shaft to rotate about a first axis of rotation. The second motor may be connected to the first motor shaft. The second motor may apply a second torque to a second motor shaft to rotate the second motor shaft about a second axis of rotation. The third motor may be connected to the second motor shaft. The third motor may apply a third torque to a third motor shaft to rotate the third motor about a third axis of rotation. The camera connection may include a third securing mechanism that may removably secure a camera to the third motor shaft of the electronic gimbal. The camera connection may furthermore comprise a third electrical interface that may communicatively couple the electronic gimbal to the camera. The internal data bus may communicatively connect the second electrical interface to the third electrical interface. The internal data bus may furthermore transfer the control signal from the handheld grip to the camera when the control button is activated to enable the control button on the handheld grip to control an action of the camera.

In another embodiment of the stabilizing mounting system, the handheld grip may comprise a shaft and a gimbal connecting means for connecting to a gimbal. The gimbal connecting means may comprise a first securing means for mechanically securing to the gimbal and may comprise a first electrical interfacing means for electrically interfacing to the gimbal. The control means on the shaft may cause a control signal to be transmitted via the gimbal connecting means. The electronic gimbal may comprise a grip connecting means for connecting to the handheld grip. The grip connecting means may include a second securing means for removably securing to the first securing means of the handheld grip and may include a second electrical interfacing means for communicatively interfacing to the first electrical interfacing means of the handheld grip. A first rotating means may be connected to the grip connecting means. The first rotating means may apply a first torque to a first motor shaft that may cause the first motor shaft to rotate about a first axis of rotation. A second rotating means may be connected to the first motor shaft. The second rotating means may apply a second torque to a second motor shaft to rotate the second motor shaft about a second axis of rotation. A third rotating means may be connected to the second motor shaft. The third rotating means may apply a third torque to a third motor shaft to rotate the third motor about a third axis of rotation. A camera connecting means may connect to a camera. The camera connecting means may include a third securing means that may removably secure the camera to the third motor shaft. The camera connecting means may further comprise a third electrical interfacing means for communicatively coupling the electronic gimbal to the camera. A data transfer means may communicatively connect the second electrical interfacing means to the third electrical interfacing means. The data transfer means may furthermore transfer the control signal from the handheld grip to the camera when the control means is activated which may enable the control means on the handheld grip to control an action of the camera.

In another embodiment, a device may comprise a camera frame allowing a camera to be rigidly and removably coupled to the camera frame. A first control connection may electrically couple to the camera. The first control connection may be located on an inner side of the camera frame. A second control connection may electrically couple to a gimbal to transmit control signals from the gimbal to the camera through the first control connection. The second control connection may be located on an outer side of the camera frame. A first video connection may electrically couple to the camera. The first video connection may be located on the inner side of the camera frame. A second video connection may electrically couple to the gimbal to transmit video data from the camera to the gimbal through the first video connection. The second video connection may be located on the outer side of the camera frame.

In another embodiment, a method, apparatus, or non-transitory computer readable storage medium may control a camera to track an object. A camera may be coupled to an electronic gimbal, which may be coupled to a rotating platform. A first angular position of the object relative to an orientation of the camera may be detected. A desired motion state of the camera for tracking the object may be determined and a motion state of the camera may be determined. A motor of the rotating platform, a motor of the gimbal, or both may be controlled depending on the desired motion state of the camera and the motion state of the camera in a manner that may reduce a difference between the motion state of the camera and the desired motion state of the camera.

In another embodiment, a method, apparatus, or non-transitory computer readable storage medium may control electronic image stabilization in a camera attached to an electronic gimbal. While the camera may be capturing a video, a camera orientation error may be detected which may represent a difference between a target orientation of the camera and a detected orientation of the camera. The camera orientation error may be compared to an error threshold. Responsive to the camera orientation error exceeding the error threshold, a high response gimbal control scheme may be applied to mechanically stabilize the camera and the electronic image stabilization may be enabled to stabilize capture of the video. Responsive to the camera orientation not exceeding the error threshold, an available power budget may be compared to a power budget threshold. Responsive to the available power budget exceeding the power budget threshold, the high response gimbal control scheme may be applied to mechanically stabilize the camera by reducing the camera orientation error and the electronic image stabilization may be disabled if previously enabled. Responsive to the available power budget not exceeding the power budget threshold, a low response gimbal control scheme may be applied to mechanically stabilize the camera by reducing the camera orientation error and the electronic image stabilization may be enabled. The low response gimbal control scheme may use less average power than the high response gimbal control scheme. The high response gimbal control scheme may decrease the camera orientation error more quickly than the low response gimbal control scheme.

Example System Configuration

FIG. 1 is a functional block diagram illustrating an example system framework. In this example, the gimbal system 160 includes a gimbal 100, a mount platform 110, a camera 120, a detachable frame 130, a camera control connection 140 and a camera output connection 141, and a gimbal control system 150. The gimbal 100 may include a sensor unit 101 and a control logic unit 102. The mount platform 110 may include a camera controller 111, an image/video receiver 112, and a control logic unit 113. The camera 120 may couple to the detachable camera frame 130 which is mounted on the gimbal 100 which is, in turn, coupled to the mount platform 110. The coupling between the gimbal 100 and the mount platform 110 may include a mechanical coupling and a communication coupling. The communication coupling may comprise an electrical connection that enables data to be exchanged between the gimbal 100 and the mount platform 110 such as, for example, control information, audio/visual information, or other data. The camera control connection 140 and a camera output connection 141 may electrically connect the camera 120 to the mount platform 110 for communication coupling. The camera control connection 140 and a camera output connection 141 may be composed of interconnecting electronic connections and data busses in the mount platform 110, gimbal 100, detachable camera frame 130 and camera 120. The gimbal control system 150 may control the gimbal 100 using a combination of a sensor unit 101 and a gimbal control logic unit 102 in the gimbal 100 and a mount platform control logic unit 113 in the mount platform 110.

The camera 120 can include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. The camera 120 can capture images and videos at various frame rates, resolutions, and compression rates. The camera 120 can be connected to the detachable camera frame 130, which mechanically connects to the camera 120 and physically connects to the gimbal 100. FIG. 1 depicts the detachable camera frame 130 enclosing the camera 120 in accordance with some embodiments. In some embodiments, the detachable camera frame 130 does not enclose the camera 120, but functions as a mount to which the camera 120 couples. Examples of mounts include a frame, an open box, or a plate. Alternately, the detachable camera frame 130 can be omitted and the camera 120 can be directly attached to a camera mount which is part of the gimbal 100.

The gimbal 100 is, in some example embodiments, an electronic three-axis gimbal which rotates a mounted object (e.g., a detachable camera frame 130 connected to a camera 120) in space (e.g., pitch, roll, and yaw). In addition to providing part of an electronic connection between the camera 120 and the mount platform 110, the gimbal may include a sensor unit 101 and a control logic unit 102, both of which are part of a gimbal control system 150. In an embodiment, the gimbal control system 150 detects the orientation of the gimbal 100 and camera 120, determines a preferred orientation of the camera 120, and controls the motors of the gimbal in order to re-orient the camera 120 to the preferred orientation. The sensor unit 101 can include an inertial measurement unit (IMU) which measures rotation, orientation, and acceleration using sensors, such as accelerometers, gyroscopes, and magnetometers. The sensor unit 101 can also contain rotary encoders, which detect the angular position of the motors of the gimbal 100, and a magnetometer to detect a magnetic field, such as the earth's magnetic field. In some embodiments, the sensors of the sensor unit 101 are placed such as to provide location diversity. For example, a set of accelerometers and gyroscopes can be located near the camera 120 (e.g., near the connection to the detachable camera frame 130) and a set of accelerometers and gyroscopes can be placed at the opposite end of the gimbal (e.g., near the connection to the mount platform 110). The outputs of these two sets of sensors can be used by the IMU to calculate the orientation and rotational acceleration of the camera, which can then be output to the gimbal control system 150. In some embodiments, the sensor unit 101 is located on the mount platform 110. In some embodiments, the gimbal control system 150 receives data from sensors (e.g., an IMU) on the mount platform 110 and from the sensor unit 101 of the gimbal 100. In some embodiment the sensor unit 101 does not include an IMU and instead receives position, acceleration, orientation, and/or angular velocity information from an IMU located on the camera 120.

The gimbal control logic unit 102, the sensor unit 101, and the mount platform control logic unit 113 on the mount platform 110 constitute a gimbal control system 150, in one embodiment. As discussed above, the IMU of the sensor unit 101 may produce an output indicative of the orientation, angular velocity, and acceleration of at least one point on the gimbal 100. The gimbal control logic unit 102 may receive the output of the sensor unit 101. In some embodiments, the mount platform control logic unit 113 receives the output of the sensor unit 101 instead of, or in addition to the gimbal control logic unit 102. The combination of the gimbal control logic unit 102 and the mount platform control logic unit 113 may implement a control algorithm which control the motors of the gimbal 100 to adjust the orientation of the mounted object to a preferred position. Thus, the gimbal control system 150 may have the effect of detecting and correcting deviations from the preferred orientation for the mounted object.

The particular configuration of the two control portions of the gimbal control system 150 may vary between embodiments. In some embodiments, the gimbal control logic unit 102 on the gimbal 100 implements the entire control algorithm and the mount platform control logic unit 113 provides parameters which dictate how the control algorithm is implemented. These parameters can be transmitted to the gimbal 100 when the gimbal 100 is originally connected to the mount platform 110. These parameters can include a range of allowable angles for each motor of the gimbal 100, the orientation, with respect to gravity, that each motor should correspond to, a desired angle for at least one of the three spacial axes with which the mounted object should be oriented, and parameters to account for different mass distributions of different cameras. In another embodiment, the mount platform control logic unit 113 performs most of the calculations for the control algorithm and the gimbal control logic unit 102 includes proportional-integral-derivative controllers (PID controllers). The PID controllers' setpoints (i.e., the points of homeostasis which the PID controllers target) can be controlled by the mount platform control logic unit 113. The setpoints can correspond to motor orientations or to the orientation of the mounted object. In some embodiments, either the gimbal control logic unit 102 or the mount platform control logic unit 113 may be omitted, and the control algorithm may be implemented entirely by the other control logic unit.

The mount platform 110 is shown electrically and mechanically connected to the gimbal 100. The mount platform 110 may be, for example, an aerial vehicle, a handheld grip, a land vehicle, a rotating mount, a pole mount, or a generic mount, each of which can itself be attached to a variety of other platforms. The gimbal 100 may be capable of removably coupling to a variety of different mount platforms. The mount platform 110 can include a camera controller 111, an image/video receiver 112, and the aforementioned control logic unit 113. The image/video receiver 112 can receive content (e.g., images captured by the camera 120 or video currently being captured by the camera 120). The image/video receiver 112 can store the received content on a non-volatile memory in the mount platform 110. The image/video receiver 112 can also transmit the content to another device. In some embodiments, the mount platform 110 transmits the video currently being captured to a remote controller, with which a user controls the movement of the mount platform 110, via a wireless communication network.

The gimbal 100 can be electrically coupled the camera 120 and to the mount platform 110 in such a way that the mount platform 110 (e.g., a remote controlled aerial vehicle or a hand grip) can generate commands via a camera controller 111 and send the commands to the camera 120. Commands can include a command to toggle the power the camera 120, a command to begin recording video, a command to stop recording video, a command to take a picture, a command to take a burst of pictures, a command to set the frame rate at which a video is recording, or a command to set the picture or video resolution. Another command that can be sent from the mount platform 110 through the gimbal 100 to the camera 120 can be a command to include a metadata tag in a recorded video or in a set of pictures. In this exemplary configuration, the metadata tag contains information such as a geographical location or a time. For example, a mount platform 110 can send a command through the gimbal 100 to record a metadata tag while the camera 120 is recording a video. When the recorded video is later played, certain media players may be configured to display an icon or some other indicator in association with the time at which the command to record the metadata tag was sent. For example, a media player might display a visual queue, such as an icon, along a video timeline, wherein the position of the visual queue along the timeline is indicative of the time. The metadata tag can also instruct the camera 120 to record a location, which can be obtained via a GPS receiver (Global Positioning Satellite receiver) located on the mount platform 110, the camera 120, or elsewhere, in a recorded video. Upon playback of the video, the metadata can be used to map a geographical location to the time in a video at which the metadata tag was added to the recording.

Signals, such as a command originating from the camera controller 111 or video content captured by a camera 120 can be transmitted through electronic connections which run through the gimbal 100. In some embodiments, telemetric data from a telemetric subsystem of the mount platform 110 can be sent to the camera 120 to associate with image/video captured and stored on the camera 120. A camera control connection 140 can connect the camera controller 111 module to the camera 120 and a camera output connection 141 can allow the camera 120 to transmit video content or pictures to the image/video receiver 112. The electronic connections can also provide power to the camera 120, from a battery located on the mount platform 110. The battery of the mount platform 110 can also power the gimbal 100. In an alternate embodiment, the gimbal 100 contains a battery, which can provide power to the camera 120. The electrical connections between the camera 120 and the gimbal 110 can run through the gimbal 100 and the detachable camera frame 130. The electrical connections between the camera 120 and the mount platform 110 can constitute a daisy chain or multidrop topology in which the gimbal 100 and detachable camera frame 130 act as buses. The electrical connections can implement various protocols such as HDMI (High-Definition Multimedia Interface), USB (Universal Serial Bus), or Ethernet protocols to transmit data. In one embodiment, the camera output connection 141 transmits video data from the camera 120 via the HDMI protocol connection and the camera control connection 140 is a USB connection. In some embodiments, the electrical connection between the camera 120 and the mount platform 110 is internal to the gimbal 100. For example, in one embodiment, a data bus is substantially enclosed in the gimbal 100 and may be exposed at an interface at either end using, for example, a male or female interface connector.

In one embodiment, an electrical signal or mechanical mechanism may enable the gimbal to detect what type of mounting platform 110 it is connected to so that it can configure itself accordingly. For example, a control signal may be sent form the mounting platform 110 to the gimbal 100 identifying the platform type. Alternatively, the gimbal 100 may detect what type of mounting platform 110 it is connected to during usage based on motion or other sensor data. For example, the gimbal 100 can detect whether its motion is more consistent with an aerial vehicle or handheld grip.

Example Aerial Vehicle Configuration

Figure 2:
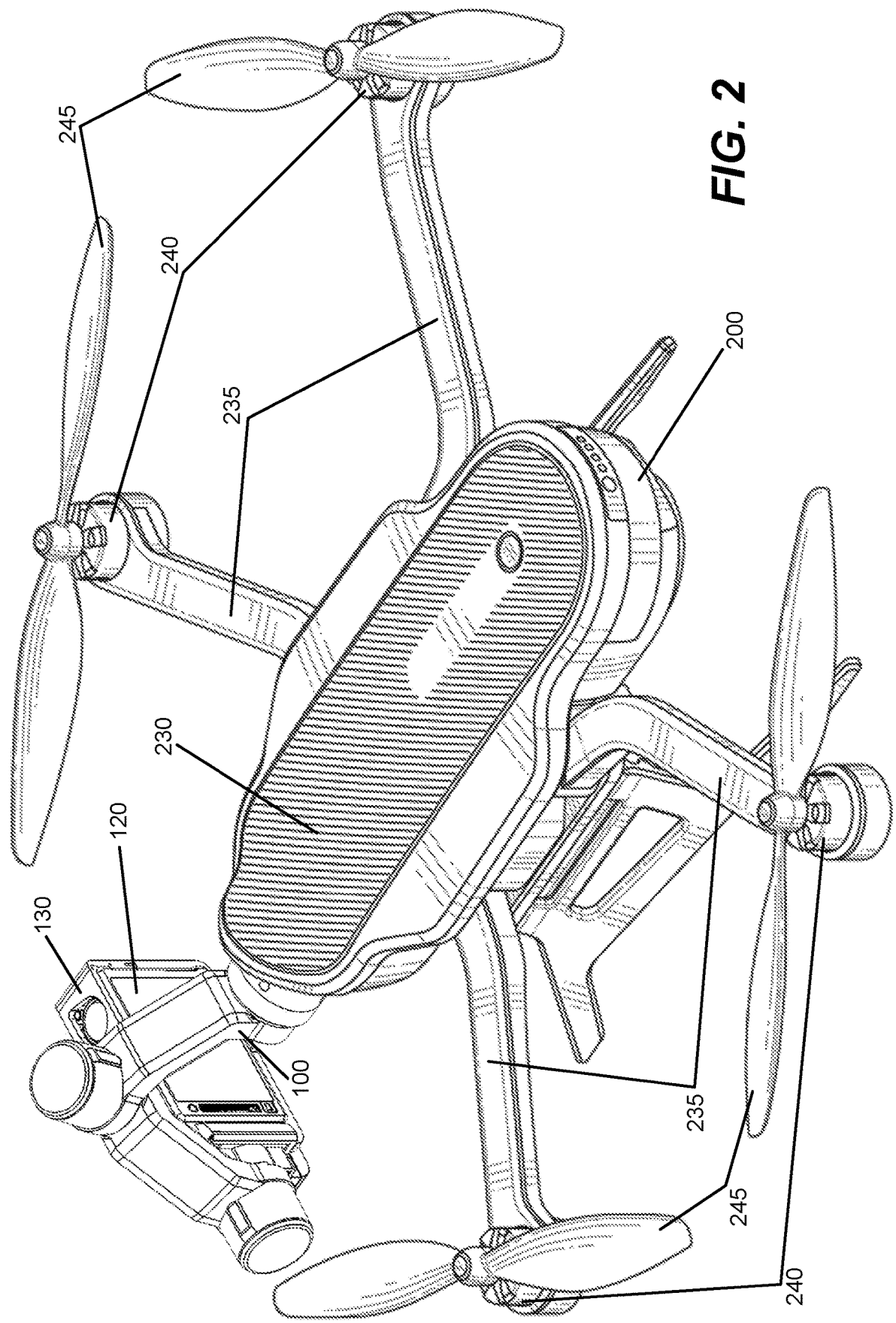
FIG. 2 illustrates an example of a gimbal coupled to a remote controlled aerial vehicle.

FIG. 2 illustrates an embodiment in which the mount platform 110 is an aerial vehicle 200. More specifically, the mount platform 110 in this example is a quadcopter (i.e., a helicopter with four rotors). The aerial vehicle 200 in this example includes housing 230 which encloses a payload (e.g., electronics, storage media, and/or camera), four arms 235, four rotors 240, and four propellers 245. Each arm 235 may mechanically couple with a rotor 240, which in turn couples with a propeller 245 to create a rotary assembly. When the rotary assembly is operational, all the propellers 245 may rotate at appropriate speeds to allow the aerial vehicle 200 lift (take off), land, hover, and move (forward, backward) in flight. Modulation of the power supplied to each of the rotors 240 can control the trajectory and torque on the aerial vehicle 200.

A gimbal 100 is shown coupled to the aerial vehicle 200. A camera 120 is shown enclosed in a removable camera frame 130 which is attached the gimbal 100. The gimbal 100 may be mechanically and electrically coupled to the housing 230 of the aerial vehicle 200 through a removable coupling mechanism that mates with a reciprocal mechanism on the aerial vehicle 200 having mechanical and communicative capabilities. The gimbal 100 can be removed from the aerial vehicle 200. The gimbal 100 can also be removably attached to a variety of other mount platforms, such as a handheld grip, a ground vehicle, and a generic mount, which can itself be attached to a variety of platforms. In some embodiments, the gimbal 100 can be attached or removed from a mount platform 110 without the use of tools.

In an embodiment, the aerial vehicle 200 includes a battery that can be used to provide power to the camera 120, the gimbal 100, or both.

Example Gimbal

Figure 3A:
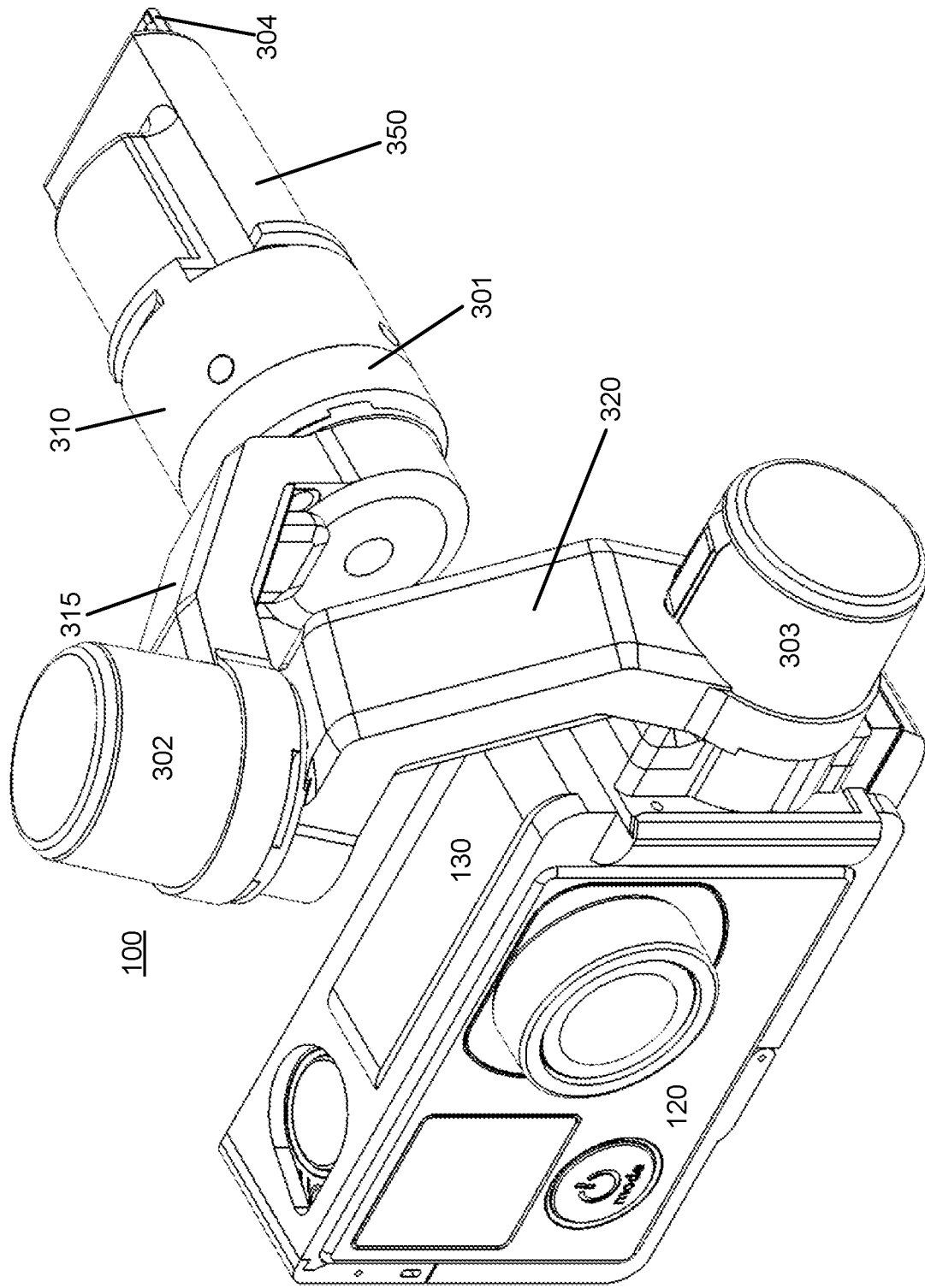

FIGS. 3A and 3B, illustrate an exemplary embodiment of the gimbal 100 attached to a removable camera frame 130, which itself is attached to a camera 120. The example gimbal 100 includes a base arm 310, a middle arm 315, a mount arm 320, a first motor 301, a second motor 302, and a third motor 303. Each of the motors 301, 302, 303 can have an associated rotary encoder, which will detect the rotation of the axel of the motor. Each rotary encoder can be part of the sensor unit 101. The base arm 310 can be configured to include a mechanical attachment portion 350 at a first end that allows the gimbal 100 to securely attach a reciprocal component on another mount platform (e.g., an aerial vehicle 200, a ground vehicle, or a handheld grip), and also be removable. The base arm 310 also includes the first motor 301. The base arm 310 may mechanically couple to the middle arm 315. A first end of the middle arm 315 may mechanically couple to the first motor 301. A second end of the middle arm 315 may mechanically couple to the second motor 302. A first end of the mount arm 320 may mechanically couple to the second motor 302. The second end of the mount arm 320 may mechanically couple to the third motor 303 which may mechanically couple to the camera frame 130. Within the camera frame 130, the camera 120 may be removably secured.

The gimbal 100 may be configured to allow for rotation of a mounted object in space. In the embodiment depicted in FIG. 3A and FIG. 3B, the mounted object is a camera 120 to which the gimbal 100 is mechanically coupled. The gimbal 100 may allow for the camera 120 to maintain a particular orientation in space so that it remains relatively steady as the platform to which it is attached moves (e.g., as an aerial vehicle 200 tilts or turns during flight). The gimbal 100 may have three motors, each of which rotates the mounted object (e.g., the camera 120) about a specific axis of rotation. Herein, for ease of discussion, the motors are numbered by their proximity to the mount platform 110 (i.e., the first motor 301, the second motor 302, and the third motor 303).

The gimbal control system 150 may control the three motors 301, 302, and 303. After detecting the current orientation of the mounted object, via the sensor unit 101, the gimbal control system 150 can determine a preferred orientation along each of the three axes of rotation (i.e., yaw, pitch, and roll). The preferred orientation may be used by the gimbal control system 150 to compute a rotation for each motor in order to move the camera 120 to the preferred orientation or keep the camera 120 in the preferred orientation. In one embodiment, the gimbal control system 150 has a preferred orientation that is configured by the user. The user can input the preferred orientation of the camera 120 with a remote controller. For example, the user can input the preferred orientation with a remote controller for a mounting platform 110, which sends the preferred orientation for the camera 120 to the mounting platform 110 (e.g., aerial vehicle 200) through a wireless network, which then provides the preferred orientation to the gimbal control system 150. In some example embodiments, an orientation can be defined relative to the ground, so that the yaw, pitch, and roll of the camera remain constant relative to the ground. In some embodiments, certain axes of rotation can be unfixed. That is, an unfixed axis of rotation may not be corrected by the gimbal control system 150, but rather may remain constant relative to the aerial vehicle 200. For example, the yaw of the camera 120 can be unfixed, while the roll and the pitch are fixed. In this case, if the yaw of the aerial vehicle 200 changes the yaw of the camera 120 will likewise change, but the roll and the pitch of the camera 120 will remain constant despite roll and pitch rotations of the aerial vehicle 200.

In some example embodiments, bounds of rotation can be defined which limit the rotation along certain axes relative to the connection between the gimbal 110 and the mount platform 110. For example, if $\alpha_{max}$ and $\alpha_{min}$ are the relative maximum and minimum values for the yaw of the camera 120 relative to the mount platform 110, then if the aerial vehicle 200 is oriented at a yaw of $\alpha_{av}$ degrees, the preferred yaw of the camera $\alpha_c$ may be chosen by the gimbal control system 150 so that the angle $\alpha_c$ is between the angles $(\alpha_{min}+\alpha_{av})$ and $(\alpha_{max}+\alpha_{av})$. Similar maximum and minimum values can be defined for the pitch and roll. The maximum and minimum for each of the relative angles can be defined such that the viewing angle of the camera 120 is not obstructed by the gimbal 100 and/or the mount platform 110 at any angle within the valid bounds. In some embodiments, the preferred orientation of the camera 120 is defined using one or more tracking algorithms, which will be further discussed herein.

The axis to which each motor corresponds can depend on the mount platform 110 to which the gimbal 100 is attached. For example, when attached to the aerial vehicle 200, the first motor 301 can rotate the mounted object about the roll axis, the second motor 302 can rotate the mounted object about the yaw axis and the third motor 303 can rotate the mounted object about the pitch axis. However, when the same gimbal 100 is attached to a handheld grip, the motors correspond to different axes: the first motor 301 can correspond to yaw axis, and the second motor 302 can corresponds to roll axis, while the third motor 303 can still corresponds to pitch axis.

In some embodiments, each of the three motors 301, 302, 303 is associated with an orthogonal axis of rotation. However, in other embodiments, such as the embodiment depicted in FIG. 3A and FIG. 3B the motors 301, 302, 303 of the gimbal 100 are not orthogonal. A gimbal 100 in which the motors are not orthogonal may have at least one motor that rotates the mounted object about an axis which is not orthogonal to the axis of rotation of the other motors. In a gimbal 100 in which the motors are not orthogonal, operation of one motor of the gimbal 100 can cause the angle of the camera 120 to shift on the axis of another motor. In the example embodiment shown in FIG. 3A and FIG. 3B, the first motor 301 and the third motor 303 have axes of rotation that are orthogonal to each other, and the second motor 302 and the third motor 303 are orthogonal, but the first motor 301 and second motor 302 are not orthogonal. Because of this configuration, when the gimbal 100 is coupled to the aerial vehicle 200 and the aerial vehicle 200 is level, operation of the first motor 301 may adjust only the roll of the camera 120 and the third motor 303 may adjust only the pitch of the camera 120. The second motor 302 may adjust the yaw primarily, but also may adjust the pitch and roll of the camera 120. Suppose for the purpose of example, the gimbal 100 is attached to the aerial vehicle 200 and the camera 120 is initially oriented at a pitch, yaw, and roll of 0° and that the axis of the second motor 302 is orthogonal to the axis of the third motor 303 and forms an angle of 0 degrees with the vertical axis, as depicted in FIG. 3B. In FIG. 3B, the angle $\theta$ is measured clockwise, and is about 16°. A rotation of $\phi$ degrees (where $-180° \leq \phi \leq 180°$ by the second motor 302 may also change the pitch, p, of the camera 120 to $p=(|\phi|*\theta)/90°$ where a pitch greater than 0 corresponds to the camera being oriented beneath the horizontal plane (i.e., facing down). The rotation of the second motor 302 by $\phi$ degrees may also change the roll, r, of the camera 120 to $r=\theta*(1-|\phi-90°|90°)$ in the case where $-90° \leq \phi < 180°$ and the roll will change to $r=-(\theta*\phi)/90°-\theta$ in the case where $-180° < \phi < -90°$. The change in the yaw, y, of the camera 120 may be equivalent to the change in angle of the second motor 120 (i.e., $y=\phi$).

A non-orthogonal motor configuration of the gimbal 100 can allow for a larger range of unobstructed viewing angles for the camera 120. For example, in the embodiment shown in FIG. 3A and FIG. 3B, the pitch of the camera 120 relative to the connection of the gimbal 100 to the mount platform 110 (e.g., aerial vehicle 200) can be about 16° higher without the camera's frame being obstructed (i.e., without the motor appearing in the image captured by the camera) than it could with an orthogonal motor configuration. In some embodiments, the second motor 302 may not be identical to the other two motors 301, 303. The second motor 302 can be capable of producing a higher torque than the other two motors 301, 303. In another embodiment, a different one of the motors 301, 302, 303 may be capable of producing a higher torque than the other two motors. In another embodiment, all three motors 301, 302, 303 may be capable of producing different amounts of torque. In yet another embodiment, all three motors 301, 302, 303 may be capable of producing substantially similar torques.

A larger value of $\theta$ (the angle between the second motor 302 and the axis orthogonal to the rotational axes of the other two motors) in a non-orthogonal motor configuration can provide a larger range of viewing angles for the mounted camera 120, but a larger $\theta$ will result in a higher maximum torque than a comparable orthogonal motor configuration. Thus, embodiments in which the motors are not orthogonal can implement a value of θ in which the two design considerations of a large viewing angle for the camera 120 and the torque from the motors are optimized. Consequently, the choice of θ will depend on many factors, such as the targeted price point of the gimbal 100, the type of cameras supported, the desired use cases of the gimbal, the available motor technology, among other things. It is noted that by way of example, θ can be between $0° \leq \theta \leq 30°$. In another embodiment, θ can be between $5° \leq \theta \leq 30°$. Other ranges are also possible.

The gimbal 100 can support a plurality of different cameras with different mass distributions. Each camera can have a corresponding detachable camera frame (e.g., camera 120 corresponds to the detachable camera frame 130), which secures the camera. A detachable camera frame 130 may have an electrical connector, or a multiplicity of electrical connectors, which couple to the gimbal 100 and an electrical connector, or a multiplicity of electrical connectors, which couple to the camera 120. Thus, the detachable camera frame 130 may include a bus for sending signals from the camera to the gimbal 100, which can, in some cases, be routed to the mount platform 110. In some embodiments, each detachable camera frame has the same types of electrical connectors for coupling to the gimbal 100, but the type of electrical connector that connects to the camera is specific to the type of camera. In another embodiment, the detachable camera frame 130 provides no electronic connection between the camera 120 and the gimbal 100, and the camera 120 and gimbal 100 are directly electrical connected (e.g., via a cable). In some embodiments, the gimbal 100 does not contain a bus and the camera 120 and the mount platform 110 communicate via a wireless connection (e.g., Bluetooth or WiFi).

In some example embodiments, the gimbal 100 may have a mount connector 304 (shown in FIG. 3B, but not in FIG. 3A) which allows the gimbal 100 to electronically couple to the mount platform 110 (e.g., the aerial vehicle 200). The mount connector 304 can include a power connection which provides power to the gimbal 100 and the camera 120. The mount connector 304 can also allow communication between the sensor unit 101 and the gimbal control logic unit 102 on the gimbal 100 and the mount platform control logic unit 113 on the mount platform 110. In some embodiments, the mount connector 304 electrically connects to the camera 120 via busses (e.g., a camera control connection 140 and a camera output connection 141) which allow communication between the mount platform 110 and the camera 120.

The gimbal 100 also can couple mechanically to a mount platform 110 via a mechanical attachment portion 350. In an embodiment, the gimbal 100 is a modular device that can be quickly and easily connected and disconnected from a mounting platform 350 (e.g., aerial vehicle 200, handheld grip, rotating mount, etc.). For example, in one embodiment, mechanical attachment portion 350 comprises a quick-release mechanism or other mechanism that does not require tools. The mechanical attachment portion 350 can be part of the base arm 310. The mechanical attachment portion 350 can include a mechanical locking mechanism to securely attach a reciprocal component on a mount platform 110 (e.g., an aerial vehicle 200, a ground vehicle, an underwater vehicle, or a handheld grip). The example mechanical locking mechanism shown in FIGS. 3A and 3B includes a groove with a channel in which a key (e.g., a tapered pin or block) on a reciprocal component on a mount platform 110 can fit. The gimbal 100 can be locked with the mount platform 110 in a first position and unlocked in a second position, allowing for detachment of the gimbal 100 from the mount platform 110. The mechanical attachment portion 350 may mechanically connect to a reciprocal component on a mount platform 110 in which the mechanical attachment portion 350 may be configured as a female portion of a sleeve coupling and where the mount platform 110 may be configured as a male portion of a sleeve coupling. Alternatively, the mechanical attachment portion 350 may be configured as a male portion of a sleeve coupling and the mount platform may be configured a female portion of a sleeve coupling. The mechanical coupling between the mount platform 110 and the gimbal 100 can be held together by a frictional force. The mechanical coupling between the mount platform 110 and the gimbal 100 can also be held together by a clamping mechanism on the mount platform 110.

If the gimbal 100 supports multiple different cameras of differing mass distributions, the differences in mass and moments of inertia between cameras might cause the gimbal 100 to perform sub-optimally. A variety of techniques are suggested herein for allowing a single gimbal 100 to be used with cameras of different mass distributions. The detachable camera frame 130 can hold the camera 120 in such a way that the detachable frame 130 and camera 120 act as a single rigid body. In some example embodiments, each camera which can be coupled to the gimbal 100 has a corresponding detachable frame, and each pair of camera and frame have masses and moments of inertia which are approximately the same. For example, if $m_{ca}$ and $m_{fa}$ are the masses of a first camera and its corresponding detachable frame, respectively, and if $m_{cb}$ and $m_{fb}$ are the masses of a second camera and its corresponding detachable frame, then, $m_{ca}+m_{fa} \approx m_{cb}+m_{fb}$. Also, $I_{ca}$ and $I_{fa}$ are the matrices representing the moments of inertia for the axes around about which the first camera rotates for the first camera and the corresponding detachable frame, respectively. In addition, $I_{cb}$ and $I_{fb}$ are the corresponding matrices for the second camera and the corresponding detachable frame, respectively. Thereafter, $I_{ca}+I_{fa} \approx I_{cb}+I_{fb}$, where "+" denotes the matrix addition operator.) Since the mounted object which is being rotated by the gimbal is the rigid body of the camera and detachable camera frame pair, the mass profile of the mounted object does not vary although the mass profile of the camera itself does. Thus, by employing detachable camera frames e.g., 130, with specific mass profiles a single gimbal 100 can couple to a multiplicity of cameras with different mass profiles.

In alternate embodiments, the mass profile of the camera 120 and detachable frame 130 pair is different for each different type of camera, but control parameters used in the control algorithms, implemented by the gimbal control system 150, which control the motors, are changed to compensate for the different mass profiles of each pair camera and detachable camera frame. These control parameters can specify the acceleration of a motor, a maximum or minimum for the velocity of a motor, a torque exerted by a motor, a current draw of a motor, and a voltage of a motor. In one embodiment, the camera 120 and/or the camera frame 130 is communicatively coupled to either the gimbal 100 or the mount platform 110, and upon connection of a camera 120 to the gimbal 100 information is sent from the camera 120 to the gimbal control system 150 which initiates the update of control parameters used to control the motors of the gimbal 100. The information can be the control parameters used by the gimbal control system 150, information about the mass profile (e.g., mass or moment of inertia) of the camera 120 and/or detachable camera mount 130, or an identifier for the camera 120 or the camera mount 130. If the information sent to the gimbal control system 150 is a mass profile, then the gimbal control system 150 can calculate control parameters from the mass profile. If the information is an identifier for the camera 120 or the detachable camera frame 130, the gimbal control system 150 can access a non-volatile memory which stores sets of control parameters mapped to identifiers in order to obtain the correct set of control parameters for a given identifier.

In some embodiments, the gimbal 100 may be capable of performing an auto-calibration sequence. This auto-calibration sequence may be performed in response to a new camera 120 being connected to the gimbal 100, in response to an unrecognized camera 120 being attached to the gimbal 100, in response to a new mount platform 110 being connected to the gimbal, or in response to an input from a user. Auto-calibration may involve moving the gimbal 100 to a number of set orientations. The speed at which the gimbal re-orients the camera 120 can be measured and compared to an expected speed. The torque exerted by the motor, the current draw of the motor, the voltage used to motor can be adjusted so that the movement of the gimbal 100 is desirable.

In some embodiments, the movement characteristics of the gimbal 100 may be adjusted according the type of mount platform 110 that the gimbal 100 is connected to. For example, each type of mount platform 110 can specify the maximum rotation speed of the gimbal 100, the maximum torque applied by the motors 301, 302, 303, or the weight given to the proportional, integral, and derivative feedback components used in a PID controller used to control a motor 301, 302, or 303. In some embodiments, the motor power used for motion dampening is determined based on the type of connected mount platform 110. Furthermore, the gimbal 100 may operate within different angle ranges along each of the roll, pitch, and yaw dimensions depending on the mount platform 110. For example, the possible angles of rotation may include a wider range when the gimbal 100 is mounted to a handheld grip than when it is mounted to an aerial vehicle.

Furthermore, as a safety and self-protection parameter, in one embodiment a motor power timeout may be triggered when excessive resistance is detected on any motor axis for a given period of time. Furthermore, for power savings, the gimbal 100 may cut power to the motors when it detects a lack of movement indicating that it is not in use. Power may be re-applied automatically when the gimbal 100 detects that it is in use again. Additionally, in one embodiment, the gimbal 100 can only be powered on when it detects that is attached to both a compatible camera 120 and a compatible mounting platform 110 and when the mounting platform 110 can provide sufficient power to both devices.

In one embodiment, the gimbal control system 150 may obtain periodic firmware updates. In one embodiment, the gimbal control system 150 may receive a firmware update via an attached handheld grip. For example, the handheld grip may receive the update via a connection (e.g., USB) to a computing device and the update may be flashed to the gimbal control system 150 via the handheld grip. In another embodiment, the gimbal control system 150 may be updated via a connected camera 120. In this case, the camera 120 may receive an update via a connected mobile application on a mobile device and subsequently transfer the update to the gimbal control system 150. In yet another embodiment, when the gimbal 100 is being used with an aerial vehicle, an update may be received on a remote control operating the aerial vehicle. The remote control alerts the user that an update is available and then wirelessly transmits the update to the aerial vehicle, which in turn sends the update to the gimbal 100. In other embodiments, firmware updates may be received via other mounting platforms 120 or via other wired or wireless connections.

In an embodiment, the gimbal 100 is constructed of a highly durable (e.g., to withstand impact) and wear-resistant material for surface finishing. Furthermore, the gimbal 100 may be constructed of materials rigid enough to limit sensor errors. Furthermore, the gimbal may be substantially waterproof and flameproof. In one embodiment, the gimbal 100 has dimensions in the range of approximately 80-100 mm in width, 70-90 mm in depth, and 80-100 mm in height.

Example Camera Architecture

Figure 4:
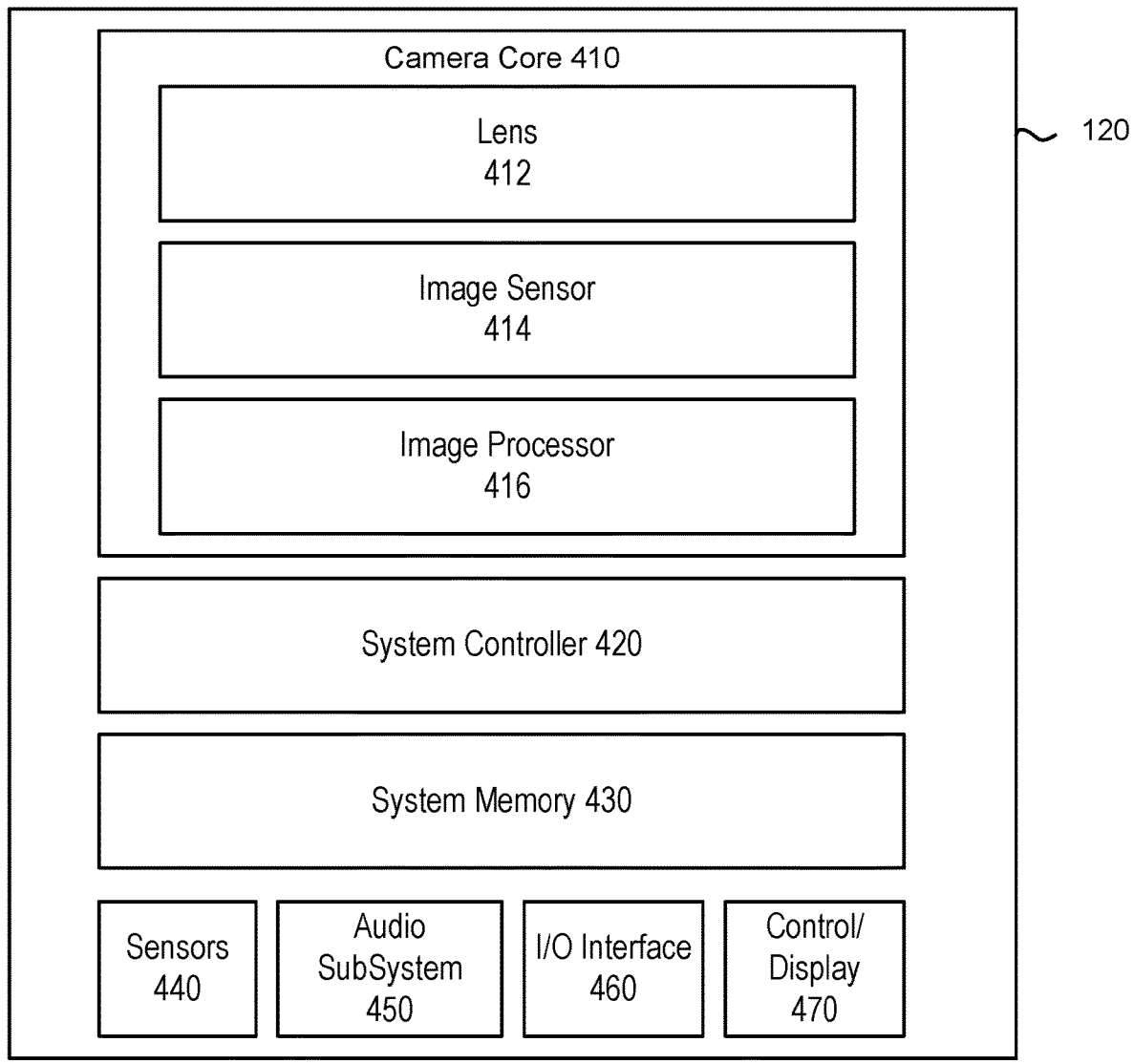
FIG. 4 illustrates a block diagram of an example camera architecture.

FIG. 4 illustrates a block diagram of an example camera architecture. The example camera architecture 405 corresponds to an architecture for the camera, e.g., 120. In one embodiment, the camera 120 is capable of capturing spherical or substantially spherical content. As used herein, spherical content may include still images or video having spherical or substantially spherical field of view. For example, in one embodiment, the camera 120 captures video having a 360° field of view in the horizontal plane and a 180° field of view in the vertical plane. Alternatively, the camera 120 may capture substantially spherical images or video having less than 360° in the horizontal direction and less than 180° in the vertical direction (e.g., within 10% of the field of view associated with fully spherical content). In other embodiments, the camera 120 may capture images or video having a non-spherical wide angle field of view.

As described in greater detail below, the camera 120 can include sensors 440 to capture metadata associated with video data, such as timing data, motion data, speed data, acceleration data, altitude data, GPS data, and the like. In a an example embodiment, location and/or time centric metadata (geographic location, time, speed, etc.) can be incorporated into a media or image file together with the captured content in order to track over time the location of the camera 120 or the subject being recorded. This metadata may be captured by the camera 120 itself or by another device (e.g., a mobile phone, the aerial vehicle 200, or a data tracker worn by a subject such as a smart watch or fitness tracker equipped with tracking software or a dedicated radio frequency tracker) proximate to the camera 120. In one embodiment, the metadata may be incorporated with the content stream by the camera 120 as the spherical content is being captured. In another embodiment, a metadata file separate from the video or image file may be captured (by the same capture device or a different capture device) and the two separate files can be combined or otherwise processed together in post-processing. It is noted that these sensors 440 can be in addition to sensors in a telemetric subsystem of the aerial vehicle 200. In embodiments in which the camera 120 is integrated with the aerial vehicle 200, the camera need not have separate individual sensors, but rather could rely upon the sensors integrated with the aerial vehicle 200 or another external device.

In the embodiment illustrated in FIG. 4, the camera 120 may comprise a camera core 410 comprising a lens 412, an image sensor 414, and an image processor 416. The camera 120 additionally may include a system controller 420 (e.g., a microcontroller or microprocessor) that controls the operation and functionality of the camera 120 and system memory 430 configured to store executable computer instructions that, when executed by the system controller 420 and/or the image processors 416, perform the camera functionalities described herein. In some embodiments, a camera 120 may include multiple camera cores 410 to capture fields of view in different directions which may then be stitched together to form a cohesive image. For example, in an embodiment of a spherical camera system, the camera 120 may include two camera cores 410 each having a hemispherical or hyper hemispherical lens that each capture a hemispherical or hyper-hemispherical field of view which are stitched together in post-processing to form a spherical image.

The lens 412 can be, for example, a wide angle lens, hemispherical, or hyper hemispherical lens that focuses light entering the lens to the image sensor 414 which captures images and/or video frames. The image sensor 414 may capture high-definition images having a resolution of, for example, 720p, 1080p, 4 k, or higher. In one embodiment, spherical video is captured in a resolution of 5760 pixels by 2880 pixels with a 360° horizontal field of view and a 180° vertical field of view. For video, the image sensor 414 may capture video at frame rates of, for example, 30 frames per second, 60 frames per second, or higher.

The image processor 416 performs one or more image processing functions of the captured images or video. For example, the image processor 416 may perform a Bayer transformation, demosaicing, noise reduction, image sharpening, image stabilization, rolling shutter artifact reduction, color space conversion, compression, or other in-camera processing functions. The image processor 416 may be configured to perform real-time stitching of images, for example, when images are captured from two or more cameras configured to capture images. Such example configurations may include, for example, an activity camera (which may include a spherical image capture camera) with image sensors, each with a substantially different field of view (FOV), but where there may be some overlap where the images can be stitched together. Processed images and video may be temporarily or persistently stored to system memory 430 and/or to a non-volatile storage, which may be in the form of internal storage or an external memory card.

An input/output (I/O) interface 460 may transmit and receive data from various external devices. For example, the I/O interface 460 may facilitate the receiving or transmitting video or audio information through an I/O port. Examples of I/O ports or interfaces include USB ports, HDMI ports, Ethernet ports, audio ports, and the like. Furthermore, embodiments of the I/O interface 460 may include wireless ports that can accommodate wireless connections. Examples of wireless ports include Bluetooth, Wireless USB, Near Field Communication (NFC), cellular (mobile) communication protocols, short range Wifi, etc., and the like. The I/O interface 460 may also include an interface to synchronize the camera 120 with other cameras or with other external devices, such as a remote control, a second camera, a smartphone, a client device, or a video server.

A control/display subsystem 470 includes various control and display components associated with operation of the camera 120 including, for example, LED lights, a display, buttons, microphones, speakers, and the like. The audio subsystem 450 includes, for example, one or more microphones and one or more audio processors to capture and process audio data correlated with video capture. In one embodiment, the audio subsystem 450 includes a microphone array having two or more microphones arranged to obtain directional audio signals.

Sensors 440 may capture various metadata concurrently with, or separately from, video capture. For example, the sensors 440 may capture time-stamped location information based on a global positioning system (GPS) sensor, and/or an altimeter. Other sensors 440 may be used to detect and capture orientation of the camera 120 including, for example, an orientation sensor, an accelerometer, a gyroscope, or a magnetometer. Sensor data captured from the various sensors 440 may be processed to generate other types of metadata. For example, sensor data from the accelerometer may be used to generate motion metadata, comprising velocity and/or acceleration vectors representative of motion of the camera 120. Furthermore, sensor data from the aerial vehicle 200 and/or the gimbal 100 may be used to generate orientation metadata describing the orientation of the camera 120. Sensor data from a GPS sensor can provide GPS coordinates identifying the location of the camera 120, and the altimeter can measure the altitude of the camera 120.

In one example embodiment, the sensors 440 may be rigidly coupled to the camera 120 such that any motion, orientation or change in location experienced by the camera 120 is also experienced by the sensors 440. The sensors 440 furthermore may associate one or more time stamps representing when the data was captured by each sensor. In one embodiment, the sensors 440 automatically begin collecting sensor metadata when the camera 120 begins recording a video.

In an embodiment, the camera 120 may be controlled by the mount platform 110 or remotely, for example, through a remote controller, or through other devices in wireless communication with the camera 120, either directly or through the mount platform 110. For example, the camera 120 may be connected to an aerial vehicle 200, and control functions of the camera 120 can be manipulated before, during or after flight (e.g., at landing) by the aerial vehicle 200 or by a remote device wirelessly communicating with the camera 120 or aerial vehicle 200. For example, during flight the camera 120 can be configured to switch from shooting images at 60 frames per second from 30 frames per second (fps). The aerial vehicle 200 may follow a skier down a slope and start capturing images through the camera 120 at 30 fps. As the skier accelerates, e.g., for a jump, the camera 120 automatically switches to capturing images at 60 fps. If the skier is in the distance, e.g., 20 meters, the camera 120 may capture images at 30 fps, but as the aerial vehicle 200 draws closer, e.g., within 5 meters, the camera 120 can automatically switch to capturing images at 60 fps.

Figure 5:
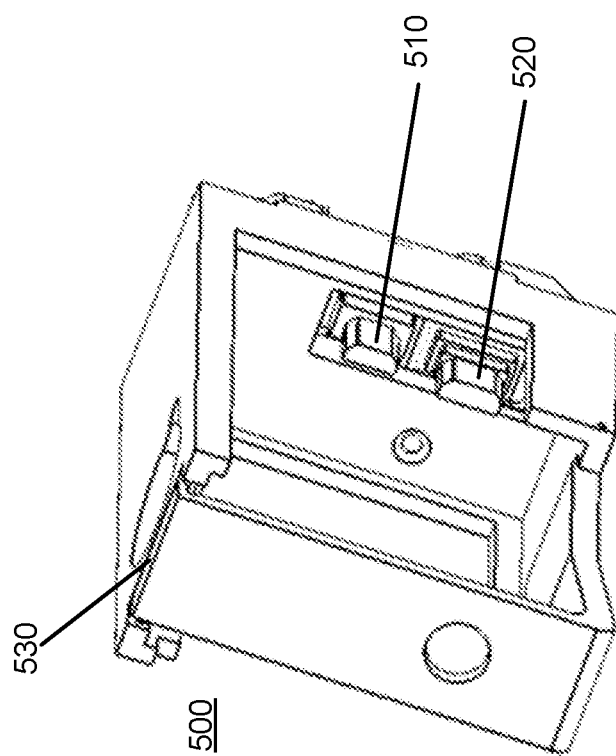
FIG. 5 illustrates an embodiment of a detachable camera frame.

The camera 120 can be partially enclosed or mounted to a detachable camera frame 130, such as the detachable camera frame 500 depicted in FIG. 5. The detachable camera frame 500 may be structured to physically couple the camera 120 to the detachable camera frame 500 and also to physically couple the detachable camera frame 500 to the gimbal 100, which is in turn coupled to a mount platform 110 such as an aerial vehicle 200, handheld grip, or rotating mount. In an embodiment, the camera 120 can be easily inserted and removed from the detachable camera frame 500 without the use of tools.

The detachable camera frame 500 also may include interfaces to facilitate communications between the camera 110 and the mount platform 110 via the gimbal 100. For example, the detachable camera frame 500 includes a micro USB connector 510 and a HDMI connector 520 that can couple with the corresponding camera (not shown). The USB connector 510, which can provide power to the camera 120 and can allow the mount platform 110 (e.g., aerial vehicle 200) to send executable instructions to the camera 120, such as a command to change the camera mode (e.g., video, single photo, burst photo, time lapse photo, etc.) frame rate of a video, or trigger the shutter to take a picture or start/stop recording video. Furthermore, a command may be sent to insert a highlight tag in the video during capture. The USB connector 510 may also charge or provide power to the camera 120 and remotely control the power on/off state of the camera 120. Additionally, metadata from the mount platform 110 (e.g., flight metadata from an aerial vehicle) may be sent to the camera 110 via the USB connector 510 or other connector on the detachable camera frame 500 to enable the metadata to be stored together with the captured video.

The HDMI connector 520 depicted may allow the camera 120 to transmit captured video, audio, and images to the mount platform 110. The detachable camera frame 500 can include any set of connectors and utilize any communication protocols to transmit data to and from the mount platform 110. The detachable camera frame 500 can include a set of connectors (not shown) which connect to the gimbal 100, so that the gimbal 100 can act as a bus for transmitting data or power between the mount platform 110 and the camera 120, and vice versa. The detachable camera frame 500 may include a latch 530 for locking the camera into the detachable camera frame 500. Detaching the latch 530 may allow the camera to be removed or installed into the detachable camera frame 500. Locking the latch 530 may rigidly couple the camera to the detachable camera frame 500.

The detachable camera frame 500 may be structured so that it does not obstruct the user's view of a rear display of the camera 120. Thus, for example, in one embodiment, the detachable camera frame 500 may be structured to secure around a perimeter of the camera 120 so as to not occlude the display of the camera 120.

In an embodiment, the detachable camera frame 500 may be constructed of a highly durable a wear-resistant material for surface finishing.

Handheld Grip

FIG. 6 illustrates an example embodiment of a mount platform 110 that can removably couple with the gimbal 100. In this example, the mount platform 110 may be a handheld grip 600 that electronically and mechanically couples with the gimbal 100. The handheld grip 600 includes a plurality of buttons 605, 610, 615, 620, 625 which can be used by a user to control the camera 120 and/or the gimbal 100. The handheld grip 600 contains a battery from which it can provide power to the gimbal 100 and may also be used to power and/or charge the camera 120, the gimbal 100, or both in addition to operating any electronic functions on the handheld grip 600 itself. For example, when all components are turned on and the handheld grip 600 is connected to a power supply, the grip 600 may provide pass-through power to operate the gimbal 100 and the camera 120 (via the gimbal 100). In one embodiment, the power may be sufficient to operate the camera 120 even if the camera battery is depleted or if no camera battery is inserted. When the components are off, the connected power supply charges both the battery in the handheld grip 600 and the battery of the camera 120 via a power path through the gimbal 100. In one embodiment, the camera 120 may be charged first until it reaches a threshold charge level, and the handheld grip may be charged second. In one embodiment, the battery comprises a low discharge battery that can at least at least several hours (e.g., at least 2-4 hours). In different embodiments, the battery may be removable or integrated with the grip 600.

In one embodiment, when the handheld grip 600 no longer has sufficient power to supply to both the camera 120 and the gimbal 100, the handheld grip 600 can send a control signal to the camera 120 to control the camera 120 to save what it has recorded and then shut down the camera 120, the gimbal 100, and the handheld grip 600.

The handheld grip 600 can be communicatively coupled to the camera 120 via a connection provided by the gimbal 100. The camera 120 can provide captured video content and images to the handheld grip 600. In one embodiment, the handheld grip can store the provided video content and images in storage media, such as a flash storage, which can be removably coupled to the handheld grip 600 (e.g., a secure digital memory card (SD card) or a micro SD card) or integrated into the handheld grip 600 itself. In an alternate embodiment, the handheld grip 600 has a port which can be used to connect to another device, such as a personal computer. This port can allow the connected device to request and receive video content and images from the camera 120. Thus, the connected device, would receive content from the camera 120 via a connection running through the detachable camera frame 130, the gimbal 100, and the handheld grip 600. In some embodiments, the port on the handheld grip 600 provides a USB connection. The USB connection or other port may be used to supply power to the battery of the handheld grip 600 or pass-through power to the gimbal 100 or camera 120. The handheld grip can also transmit executable instructions to the camera 120. These instructions can take the form of commands which are sent to the camera 120 responsive to a user pressing a button on the handheld grip 600.

In some embodiments, the handheld grip includes a plurality of buttons 605, 610, 615, 620, 625. An instruction can be sent from the handheld grip 600 to the camera 120 responsive to pressing a button. In an embodiment, at least one of the buttons 605, 610, 615, 620, 625 are accessible from both the front and back of the handheld grip 600 so that the user can use the buttons 605, 610, 615, 620, 625 to change camera parameters while not recording. In one embodiment, a first button 605 takes a picture or a burst of pictures. The first button 605 can also begin recording a video or terminate the recording of a video if it is currently recording. In some embodiments, the camera 120 can be in a picture mode, in which it takes pictures or bursts of pictures, or a video mode, in which it records video. The result of pressing the first button 605 can be determined by whether the camera 120 is in video mode or camera mode. A second button 610 can toggle the mode of the camera 120 between the video mode and picture mode. A third button 615 can toggle the power of the handheld grip 600, the camera 120, and the gimbal 100 (e.g., in a single press to power on all devices simultaneously). In one embodiment, the gimbal 100 can detect whether or not a camera 120 is attached to it and will not turn on after pressing the power button 615 unless a camera 120 is attached to it. A fourth button 620 can change the mode of the camera 120 so that it takes bursts of pictures rather than a single picture responsive to pressing the first button 605. A fifth button 625 can change the frame rate at which the camera 120 records videos. In some embodiments, a button on the handheld grip can also change the resolution or compression rate at which pictures or videos are recorded. The handheld grip can include light emitting diodes (LEDs) or other visual indicators which can indicate the mode that the camera is operating in. For example, an LED of a first color can be turned on in order to indicate that the camera 120 is in picture mode and an LED of a second color can be turned on to indicate that the camera 120 is in video mode. Additionally, the LEDs may indicate a power status, charging status, when the battery is depleted, error states (e.g., that calibration is suggested), etc. In one embodiment, the status indicators on the grip 600 operate according to a same pattern as that on a remote control device described in further detail below to provide ease of operation for a user when switching the camera 120 and gimbal 100 between different mounting platforms 110. Additionally, operating the buttons 605, 610, 615, 620, 625 on the handheld grip 600 can cause a display on the camera 120 to change (e.g., on a rear display screen) in order to notify the user of the changing camera settings. Furthermore, the handheld grip 600 may send information to display on the camera, such as, for example, an error state indicating that the gimbal 100 should be re-calibrated. In one embodiment, the gimbal 100 may first attempt a self-recalibration and only alert the user if the self-recalibration fails.

In one embodiment, the handheld grip 600 has only two buttons: a first button 605 which operates generally as a shutter button, and a second button 610 which provides a number of different functions including, for example, power on/off, mode change, inserting a metadata tag, and providing a reset. For example, in a particular configuration, a short press of the second button 610 (e.g., less than 5 seconds) when the grip 600 is off simultaneously turns on the grip 600, the gimbal 100, and the camera 120. Alternatively, a long press of the second button 610 (e.g., more than 5 seconds) when the grip is initially off turns on the grip 600, the gimbal 100, and the camera 120 in a calibration mode (e.g., a reset). When the grip 600 is on but not recording video, a short press of the second button 610 may operate to change between operating modes of the camera 120 (e.g., single photo, burst photo, time lapse photo, video, etc.) while a long press simultaneously powers off the grip 600, the camera 120, and the gimbal 100. Furthermore, pressing the second button 610 while the camera 120 is recording video may instructs the camera 120 to insert a metadata tag in a recorded video, where the metadata tag can specify the time at which the second button 610 was pressed. This feature enables the user to easily highlight a moment in the captured video and later identify the highlighted moment for replay and/or editing.

In the two button embodiment, the first button 605 may operate generally as a shutter button. For example, when the grip 600, gimbal 100, and camera 120 are turned on, a short press of the first button 605 may cause the camera 120 to start or stop recording video or take a photograph, depending on the current camera/video mode. Furthermore, a long press of the first button 605 when the grip 600, gimbal 100, and camera 120 are turned on may cycle between gimbal modes as discussed below. Additionally, in one embodiment, a long press of the first button 605 when the grip 600, gimbal 100, and camera 120 are off may cause the grip 600, gimbal 100, and camera 120 to turn on and automatically begin capturing video or take a photograph with a single press.

Additionally, the buttons on the handheld grip 600 or on the camera 120 may be used to configure other aspects of the gimbal 100 such as, for example, a stabilization mode (discussed further below), a pitch velocity, pitch position, yaw velocity, yaw position, update frame IMU data, status information, or firmware updates.

In some embodiments, the handheld grip 600 can include an audio output device, such as an electroacoustic transducer, which plays a sound responsive to pressing a button. The sound played by the audio output device can vary depending on the mode of the camera. By way of example, the sound that is played when a video recording is initiated is different than the sound that is played when a picture is taken. As will be known to one skilled in the art, additional buttons with additional functions can be added to the handheld grip 600 and some or all of the aforementioned buttons can be omitted.

In some embodiments, the rotational angle of the camera 120 to which each motor corresponds can vary depending on the mount platform 110 to which the gimbal 100 is attached. In the embodiment shown in FIG. 6, the first motor 301 controls the yaw of the camera 120, the second motor 302 (not shown in FIG. 6) controls the roll of the camera 120, and the third motor 303 controls the pitch of the camera 120. This configuration differs from that in FIG. 3A and FIG. 3B which depict the motors controlling the roll, yaw, and pitch, respectively. In some embodiments, the same gimbal 100 can operate in both configurations, responsive to the mount platform 110 to which it is connected. For example, when connected to the handheld grip 600 the gimbal's motors can operate as yaw, roll, and pitch motors, respectively, and when connected to the aerial vehicle 200 the gimbal's motors can operate as roll, yaw, and pitch motors.

In some embodiments, the camera's rotation for each axis of rotation can be fixed or unfixed. When the camera's rotation is fixed on an axis, the gimbal 100 will operate to ensure that the camera will maintain that same orientation (or approximately so), relative to a reference (e.g., the horizon or user-defined heading), on that axis despite the movement of the handheld grip. Conversely, when the rotation of the camera 120 is unfixed on an axis, then the camera's rotation on that axis can change when the handheld grip 600 is rotated. For example, if the yaw of the camera 120 is unfixed then a change in the yaw of the handheld grip 600 by ϕ degrees can correspond to a change in the yaw of the camera 120 by ϕ or −ϕ degrees (depending on the point of reference for which the yaw is considered). If all three of the camera's axes are unfixed, then the motors 301, 302, 303 of the gimbal 100 will remain fixed (i.e., they will not turn) when the handheld grip 600 changes orientation. The gimbal control system 150 can have a fixed yaw mode and an unfixed yaw mode which dictates that the yaw of the camera 120 should remain fixed or unfixed, respectively. Similarly the gimbal control system 150 can have a fixed and unfixed mode for the roll and the pitch. The user can set the mode to unfixed for a certain axis and reorient the camera 120 to the desired angle along that axis, then set the mode for the axis to fixed so the camera 120 will remain at that angle. This will allow a user to easily set the preferred angle of the camera relative to the ground. The gimbal control system 150 can still stabilize the rotation along an axis, while in unfixed mode. In one embodiment, a second button 610 toggles the yaw mode between fixed and unfixed, the third button 615 toggles the pitch mode between fixed and unfixed, and the forth button 620 toggles the roll mode between fixed and unfixed. The axes of the gimbal 100 can be in a fixed mode or unfixed mode while connected to the aerial vehicle 200, as well.

In one embodiment, three selectable stabilization modes are enabled. In a first stabilization mode (e.g., a yaw "follow" mode), the yaw is unfixed and the pitch and roll are fixed relative to a horizon line-of-sight. In this embodiment, the yaw will be roughly fixed in the same direction relative to the mount device so that camera rotates as the user rotates the handheld grip 600, thus enabling the camera 110 to capture a horizontal pan across a scene with the pitch and roll will remain fixed relative to a horizontal plane (e.g., the ground or horizon line-of-sight). In one embodiment, instead of the yaw being completely unfixed, the rotation may be dampened by the gimbal 100 applying a small counteracting force in order to smooth the panning motion. In one embodiment, this first stabilization mode may be a default mode.

In a second stabilization mode (e.g., a tracking "locked" mode), the roll may be fixed (i.e., stabilized) relative to a horizon line-of-sight, the pitch is fixed (i.e., stabilized) at a user-defined angle which is set at a user-defined pitch when the mode is activated, and the yaw may be fixed (i.e. stabilized) at a user-defined heading set when the mode is activated. This mode may enable the user to lock the camera onto a particular user defined location while maintaining the camera roll level to the ground.

In a third stabilization mode, (e.g., a yaw and pitch follow mode), the roll may be fixed (i.e. stabilized) relative to a horizon line-of-sight, the pitch is unfixed but may optionally be dampened to smoothly follow the vertical orientation of the handheld grip 600, and the yaw may be unfixed but may optionally be dampened to smoothly follow the horizontal orientation of the handheld grip 600. This mode thus may enable the user to stabilize the camera roll level to ground, but allowing the user to follow a moving object with the camera 120.

In an embodiment, the handheld grip 600 may be constructed of a highly durable a wear-resistant material for surface finishing.

Example Aerial Vehicle System

Figure 7:
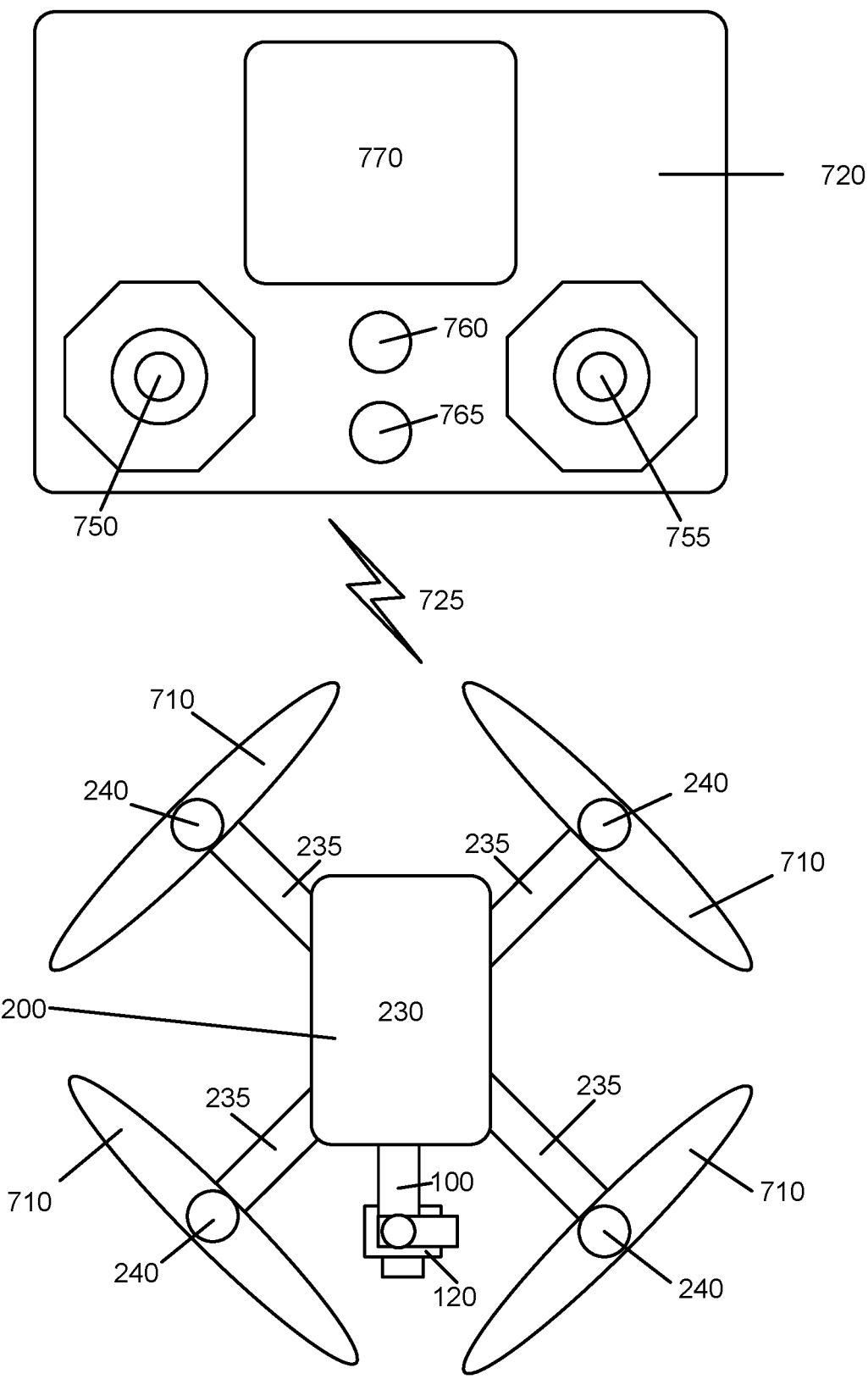
FIG. 7 illustrates an example configuration of remote controlled aerial vehicle in communication with a remote controller.

FIG. 7 illustrates a gimbal 100 attached to a remote controlled aerial vehicle 200, which communicates with a remote controller 720 via a wireless network 725. The remote controlled aerial vehicle 200 in this example is shown with a housing 230 and arms 235 of an arm assembly. In addition, this example embodiment shows a thrust motor 240 coupled with the end of each arm 130 of the arm assembly. Each thrust motor 240 may be coupled to a propeller 710. The thrust motors 240 may spin the propellers 710 when the motors are operational. The gimbal 100 mechanically connects a camera 120 to the remote controlled aerial vehicle 200 and may also provide an electrical communication path between the camera 120 and the remote controlled aerial vehicle 200.

The aerial vehicle 200 may communicate with the remote controller 720 through the wireless network 725. The remote controller 725 can be a dedicated remote controller or can be another computing device such as a laptop, smartphone, or tablet that is configured to wirelessly communicate with and control the aerial vehicle 200. In one embodiment, the wireless network 725 can be a long range Wi-Fi system. It also can include or be another wireless communication system, for example, one based on long term evolution (LTE), 3G, 4G, or 5G mobile communication standards. In place of a single wireless network 725, the unidirectional RC channel can be used for communication of controls from the remote controller 720 to the aerial vehicle 200 and a separate unidirectional channel can be used for video downlink from the aerial vehicle 200 to the remote controller 720 (or to a video receiver where direct video connection may be desired).

The remote controller 720 in this example includes a first control panel 750 and a second control panel 755, an ignition button 760, a return button 765 and a display 770. A first control panel, e.g., 750, can be used to control "up-down" direction (e.g. lift and landing) of the aerial vehicle 200. A second control panel, e.g., 755, can be used to control "forward-reverse" direction of the aerial vehicle 200. Each control panel 750, 755 can be structurally configured as a joystick controller and/or touch pad controller. The ignition button 760 can be used to start the rotary assembly (e.g., start the propellers 710). The return button 765 can be used to override the controls of the remote controller 720 and transmit instructions to the aerial vehicle 200 to return to a predefined location as further described herein. The ignition button 760 and the return button 765 can be mechanical and/or solid state press sensitive buttons. In addition, each button may be illuminated with one or more light emitting diodes (LED) to provide additional details. For example the LED can switch from one visual state to another to indicate with respect to the ignition button 760 whether the aerial vehicle 200 is ready to fly (e.g., lit green) or not (e.g., lit red) or whether the aerial vehicle 200 is now in an override mode on return path (e.g., lit yellow) or not (e.g., lit red). The remote controller 720 can include other dedicated hardware buttons and switches and those buttons and switches may be solid state buttons and switches. The remote controller 720 can also include hardware buttons or other controls that control the gimbal 100. The remote control can allow its user to change the preferred orientation of the camera 120. In some embodiments, the preferred orientation of the camera 120 can be set relative to the angle of the aerial vehicle 200. In another embodiment, the preferred orientation of the camera 120 can be set relative to the ground.

The remote controller 720 also includes a screen (or display) 770 which provides for visual display. The screen 770 can be a touch sensitive screen. The screen 770 also can be, for example, a liquid crystal display (LCD), an LED display, an organic LED (OLED) display or a plasma screen. The screen 770 can allow for display of information related to the remote controller 720, such as menus for configuring the remote controller 720 or remotely configuring the aerial vehicle 200. The screen 770 also can display images or video captured from the camera 120 coupled with the aerial vehicle 200, wherein the images and video are transmitted via the wireless network 725. The video content displayed by on the screen 770 can be a live feed of the video or a portion of the video captured by the camera 120. For example, the video content displayed on the screen 770 is presented within a short time (preferably fractions of a second) of being captured by the camera 120. In some embodiments, the layout of the visual display is adjusted based on the camera 120 connected to the gimbal 100. For example, if the camera 120 is not capable of providing a live feed of captured video, the visual display layout may be adjusted to omit a panel for display of the live camera feed, whereas otherwise the life feed would be displayed.

The video may be overlaid and/or augmented with other data from the aerial vehicle 200 such as the telemetric data from a telemetric subsystem of the aerial vehicle 200. The telemetric subsystem may include navigational components, such as a gyroscope, an accelerometer, a compass, a global positioning system (GPS) and/or a barometric sensor. In one example embodiment, the aerial vehicle 200 can incorporate the telemetric data with video that is transmitted back to the remote controller 720 in real time. The received telemetric data can be extracted from the video data stream and incorporate into predefine templates for display with the video on the screen 170 of the remote controller 720. The telemetric data also may be transmitted separate from the video from the aerial vehicle 200 to the remote controller 720. Synchronization methods such as time and/or location information can be used to synchronize the telemetric data with the video at the remote controller 720. This example configuration allows a user, e.g., operator, of the remote controller 720 to see where the aerial vehicle 200 is flying along with corresponding telemetric data associated with the aerial vehicle 200 at that point in the flight. Further, if the user is not interested in telemetric data being displayed real-time, the data can still be received and later applied for playback with the templates applied to the video.

Additionally, error conditions or other flight status information may be transferred form the aerial vehicle 200 to the remote controller 720 for display.

The predefine templates can correspond with "gauges" that provide a visual representation of speed, altitude, and charts, e.g., as a speedometer, altitude chart, and a terrain map. The populated templates, which may appear as gauges on screen 170 of the remote controller 720, can further be shared, e.g., via social media, and or saved for later retrieval and use. For example, a user may share a gauge with another user by selecting a gauge (or a set of gauges) for export. Export can be initiated by clicking the appropriate export button, or a drag and drop of the gauge(s). A file with a predefined extension will be created at the desired location. The gauge to be selected and be structured with a runtime version of the gauge or can play the gauge back through software that can read the file extension.

In one embodiment, when the gimbal 100 is connected to the aerial vehicle 200 it is automatically configured to operate in a fourth mode in which the roll is stabilized at a horizon line-of-sight, the pitch is stabilized at a user-defined angle set using the remote controller 720, and the yaw is unfixed (but may optionally be dampened to smooth rotation) to enable to follow the orientation of the aerial vehicle 200. In another embodiment, a mode may be available in which the yaw is also stabilized. In this embodiment, the gimbal 100 may receive flight controller information from the aerial vehicle 200 to enable it to proactively stabilize against impending yaw movements of the aerial vehicle 200. In another embodiment, the gimbal 100 itself may determine the motion of the aerial vehicle 200 to enable it to stabilize.

Dampening Connection

Figure 8A:
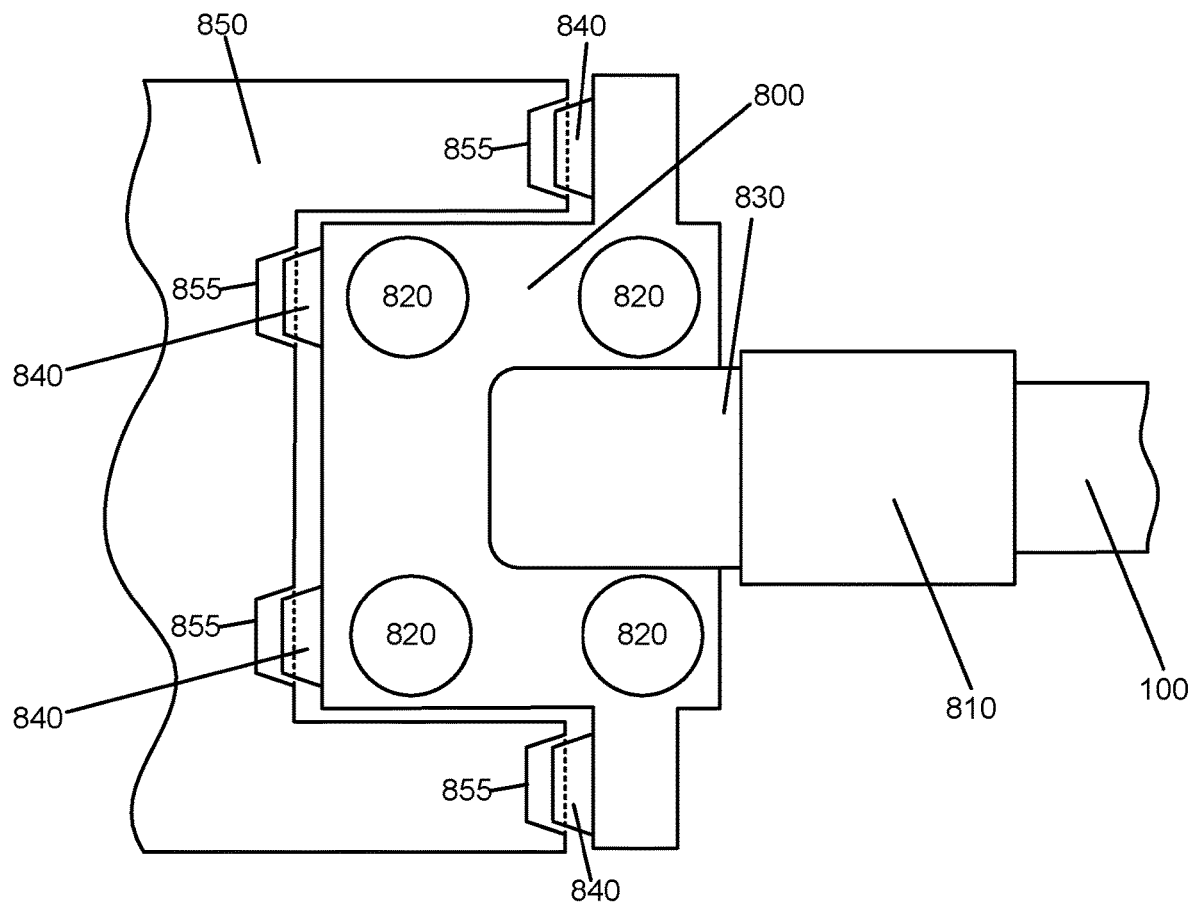
FIGS. 8A and 8B illustrates an example of a dampening connection for coupling a gimbal to a mount platform.
Figure 8B:
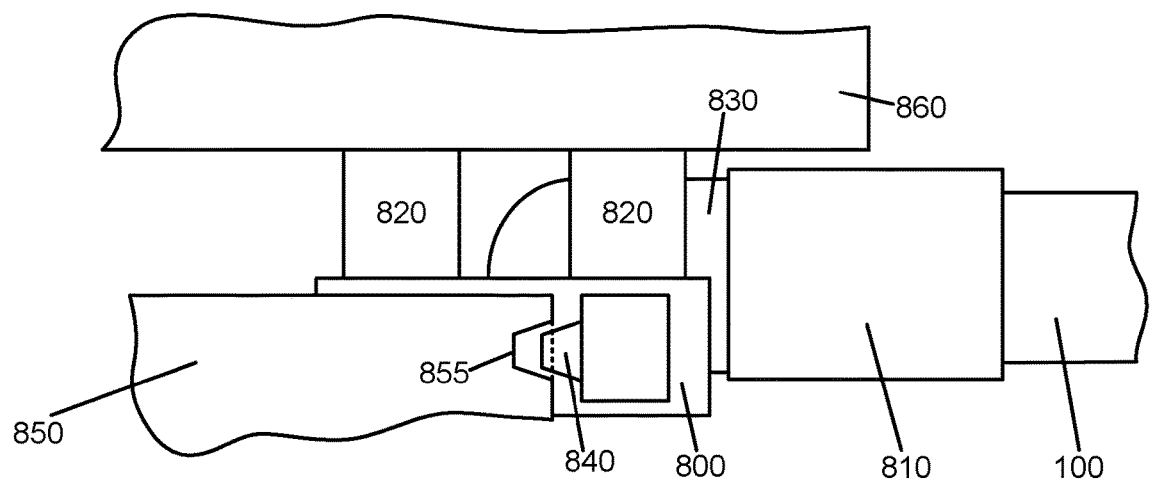

FIGS. 8A and 8B show an example of a dampening connection, which can be a connection between the gimbal 100 and a mount platform 110, such as the aerial vehicle 200. The dampening connection can include a floating connection base 800, a locking cylindrical shell 810, a plurality of elastic pillars 820 (e.g., four elastic pillars 820), a connection housing 830, a plurality of tapered locking blocks 840 (e.g., four tapered locking blocks 840), a fixed mount floor 850 with four slots 855, and a fixed mount ceiling 860. The fixed mount floor 850 and the fixed mount ceiling 860 may rigidly attach to the mount platform 110 such that a gap exists between a top surface of the fixed mount floor 850 and a bottom surface of the fixed mount ceiling 860. The fixed mount floor 850 may furthermore include a side surface adjacent to the floating connection base 800. The locking cylindrical shell 810 may attach to the connection housing 830, and may be capable of being rotated, which can be used to lock the attachment portion 350 of the gimbal 100 into the connection housing 830. The connection housing 830 may attach (e.g., rigidly) to the floating connection base 800. The floating connection base 800 may attach to the fixed mount ceiling 860 by the four elastic pillars 820. For example, the elastic pillars 820 may protrude from a bottom surface of the fixed mount ceiling 860 and may mechanically couple to a top surface of the floating connection base 800 such that the floating connection base 800 hangs below the fixed mount ceiling 860 and adjacent to the fixed mount floor 850. The floating connection base 800 may have a plurality of tapered locking blocks 840 projecting out of it towards the fixed mount floor 850. For example, the tapered locking blocks 840 may protrude from the floating connection base 800 in a direction substantially perpendicular to the plurality of elastic pillars 820.

In this embodiment, each of the tapered locking blocks 840 has a corresponding slot 855 into which it fits. The corresponding slots 855 may be bored into the fixed mount floor 850 to form a cavity reciprocal to the locking blocks 840. The tapered locking blocks 840 may be tapered such that a first end attached to the floating connection base 800 has a greater diameter than a second end protruding into or adjacent to the locking slots 855.

Compared to a rigid mechanical connection, the dampening connection can help to dissipate high frequency vibrations in the gimbal 100 and to prevent, to some degree, the gimbal 100 from vibrating, for example, when the aerial vehicle 200 is operational. The dampening may operate both to enable the camera 120 to capture more stable video and also to avoid audible artifacts from vibrations of the camera 120, gimbal 100, or mounting platform 110. The dampening connection depicted in FIGS. 8A and 8B is a mechanical connection between the gimbal 100 and the aerial vehicle 200, but similar structures can be used to connect the gimbal 100 to other mount platforms, such as ground vehicle, an underwater vehicle, or a handheld grip. FIG. 8A shows a vertical perspective (looking down) of the dampening connection, wherein the fixed mount ceiling 860 has been removed. FIG. 8B shows a horizontal view of the dampening connection. Both FIG. 8A and FIG. 8B are simplified for illustrative purposes, and thus the shapes, relative sizes, and relative positions of the components of the dampening connection are shown for ease of discussion purposes.

The dampening connection can comprise a floating connection base 800, which may be mechanically coupled to four elastic pillars 820. The elastic pillars 820 may mechanically connect the floating connection base 800 to the fixed mount ceiling 860. Aside from the four elastic pillars 820, the floating connection base 800 is not rigidly connected to the other components of the aerial vehicle 200 in one embodiment, which allows it a small range of motion. The floating connection base 800 may be rigidly mechanically coupled to a connection housing 830. When the gimbal 100 is locked into the connection housing 830, the connection housing 830 may contain the mount connector 304 of the gimbal 100. The electronic connector which electrically connects the gimbal 100 and the aerial vehicle 200 may be enclosed in the connection housing 830.

A locking cylindrical shell 810 may be mechanically connected to the connection housing 830. The locking cylindrical shell 810 can rotate along its axis. The user can insert the end of the gimbal 100 into the connection housing 830 and turn the locking cylindrical shell 810 (e.g., to a first position) in order to lock the gimbal 100 to the connection housing 830. When the gimbal 100 and the connection housing 830 are thus locked together, the gimbal 100, the connection housing 830, and the floating connection base 800 are all rigidly connected together. A user can unlock the gimbal 100 from the connection housing 830 by twisting the locking cylindrical shell 810 in the opposite direction (e.g., to a second position), which will allow the user to remove the gimbal 100 from the connection housing 830.

When a contact force is exerted on the gimbal 100 by the user in order to insert the mount connector 304 into the connection housing 830, the floating connection base 800 will be pushed backwards (e.g., in FIGS. 8A and 8B, the force would be directed to the left). This may cause a deformation of the elastic pillars 820 due to a shearing force, and the tapered locking blocks 840 may be forced into the corresponding slots 855 on the fixed mount floor 850. For example, when a net contact force is applied to the floating connection base 800 in a direction towards the fixed mount floor 850, first ends of the elastic pillars 820 attached to the floating connection base 800 may be displaced relative to second ends of the elastic pillars attached to the fixed mount ceiling 860. The elastic pillars 820 may be mechanically coupled to the floating connection base 800 and to the fixed mount ceiling 860, and, in the absence of a shearing force, hold the floating connection base 800 at an equilibrium position, relative to the fixed mount ceiling 860, which is rigidly mechanically coupled to the chassis of the aerial vehicle 200. The fixed mount floor 820 may also be rigidly mechanically coupled to the chassis of the aerial vehicle 200. In some embodiments, the fixed mount floor 820 and the fixed mount ceiling 860 are conjoined.

In one embodiment, at equilibrium (e.g., when the user is not applying a contact force on the gimbal 100), the tapered locking blocks 840 are held, by shear forces on the elastic pillars 820, at a position that is not flush with the corresponding slots 855. In other words, a gap exists between ends of the locking blocks 840 and corresponding ends of the plurality of slots 855. The gap between the tapered locking blocks 840 and their corresponding slots 855 can be small (e.g., 2-5 millimeters). In some embodiments, at equilibrium, the tapered locking blocks 840 rest outside the corresponding slots 855. When a force pushes the tapered locking blocks 840 into the slots 855 on the fixed mount floor 850, the floating connection base 830 can be locked in place, which can make it easier for the user to turn the locking cylindrical shell 810. For example, when a net contact force is applied in a direction to the floating connection base 830 in a direction towards the fixed mount floor 850, the ends of the locking blocks 840 can be flush with corresponding ends of the locking slots 855. Once the user is no longer pushing on the gimbal 100, the restoring sheer force on the elastic pillars 820 can move the floating connection base 830 back into its equilibrium position. In this equilibrium position, the floating connection base 830 has some freedom of movement, which can have the result of dampening oscillations on the gimbal 100 or the aerial vehicle 200. Thus, when connected to the aerial vehicle 200, the gimbal 110 can "float" (i.e., is not rigidly coupled to the aerial vehicle 200) during normal operation.

Rotating Platform

Figure 9:
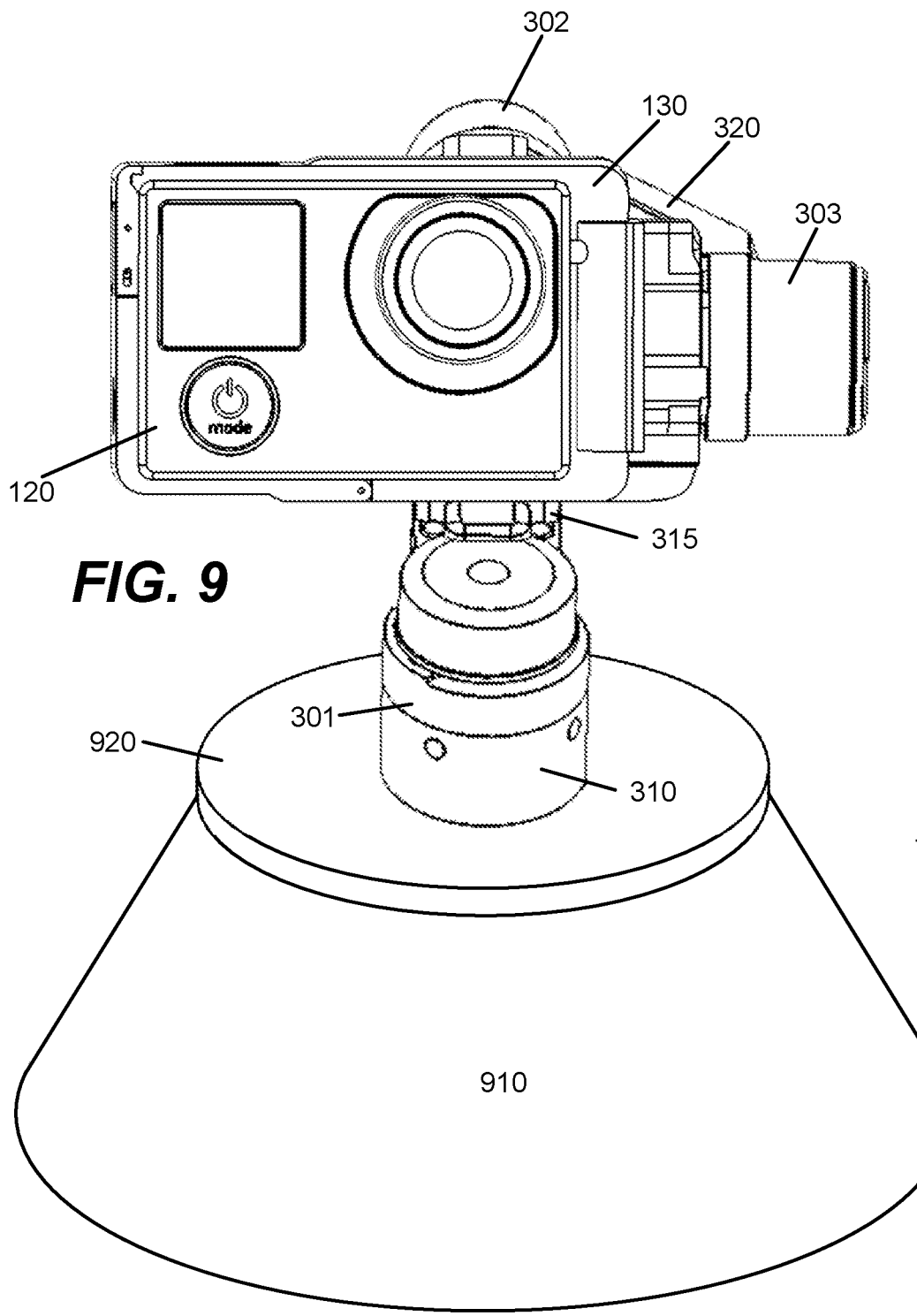
FIG. 9 illustrates an example of a gimbal coupled to a rotating platform.

FIG. 9 illustrates an example embodiment of a gimbal 100 coupled to a rotating platform 900. The rotating platform 900 may include a base 910 and a rotating gimbal mount 920. The mount connector 310 of the gimbal 100 may couple to a reciprocal coupling end of the rotating gimbal mount 920. The base 910 may contain a motor which rotates a shaft, which is coupled to the rotating gimbal mount 920. Operation of this motor can be controlled by control logic in the rotating platform 900. The motor in the base 910 can be used to rotate the gimbal 100 and the camera 120, thus facilitating panning of the camera 120 or tracking of an object. The camera 120 in FIG. 9 is depicted with a pitch of about 45° upwards.

In an embodiment, the rotating gimbal mount 920 rotates relative to the base 910, which in turn rotates the gimbal 100 and the camera 120. In this example configuration, when the base 910 is level relative to the ground, rotation of the rotating gimbal mount 920 adjusts the yaw of the camera 120. If the first motor 301 of the gimbal 100 is not able to rotate continuously (e.g., the first motor 301 is restricted to a certain range of angles) the rotating platform 900 can be used to continuously rotate the camera 120, whereas otherwise that would not be possible.

In some embodiments, the motor which rotates the rotating gimbal mount 920 and the first motor 301 of the gimbal 100 have the same axis of rotation. The gimbal control system 150 can utilize both the first motor 301 and the motor connected to the rotating gimbal mount 920 in conjunction. The motor connected to rotating gimbal mount 920 can be capable of relatively high torque and speed, but be less precise than the first motor 301. The motor connected to rotating gimbal mount 920 can be used to provide large rotational velocity and acceleration, while the first motor 301 performs comparatively smaller rotations that serve to smooth out the panning of the camera 120.

The base 910 may also contain a battery, with which it provides power to the gimbal 100 and the camera 120. The base 910 may also connect to an external power supply. In some embodiments, the base includes an interface to receive instructions to perform an action with the camera 120 or instructions that specify which object the camera 120 is to track. The interface may be a physical interface such as buttons, switches, or a touch screen by which input from a user is received. The interface can be a communication interface which allows the rotating platform 900 to receive instructions from an external device. This external device can, for example, be a dedicated remote controller or a generic user device. The communication interface can be a wired communication interface which utilizes protocols such as Ethernet, USB, or HDMI or a wireless communication interface such as a WiFi or Bluetooth. The communication interface can be used to receive instructions and to transmit images and video captured by the camera 120 to the external device. In some embodiments, the base 910 also includes weights, which serve to keep the rotating platform 900 upright and stable. In some embodiments, the base 910 can be directly connected to a floor or wall.

The base 910 of the rotating platform 900 may include a mount platform control logic unit 113. The mount platform control logic unit 113 may implement an algorithm in which the rotating gimbal mount 920 is used for panning rotation and the motors of the gimbal 301, 302, 303 are used for precise movement. For example, if the camera 120 is tracking a quick-moving object, then, in order to track the object, the yaw of the camera 120 may need to be rotated quickly. The control algorithm implemented by the mount platform control logic unit 113 can do "broad" tracking, in regards to yaw, with the rotating gimbal mount 920 and "precise" tracking with the first motor 301 of the gimbal 100. In this manner, a powerful, imprecise motor in the rotating platform 900 and an accurate, low torque first motor 301 in the gimbal 100 may be used in conjunction to produce a yaw rotation that is quick, which a potential for high acceleration, but is still able to track an object precisely.

In some embodiments, the mount platform control logic 113 controls the camera 120, the motor in the base 910, and/or the gimbal 100 to pan the camera 120 to take panoramic photos. Capturing a panoramic photo may comprise capturing multiple images with the camera 120 at different orientations and stitching the images together with image processing software to generate a single composite panoramic photo. In some embodiments, the panoramic photo comprises a 360° photo. In some embodiments, the mount platform control logic 113 controls the camera 120, the motor in the base 910, and/or the gimbal 100 to pan the camera slowly in order to generate a time lapse video. The frame rate of the time lapse video may be based on the movement speed of an object tracked by the camera 120. The frame rate may be determined such that the tracked object appears to move smoothly in the video. For example, a time lapse video can be captured of a hiker who is far away from the camera 120. The mount platform control logic 113 can control the panning and image capture of the camera 120 to capture time lapse video in which the hiker moves smoothly without capturing an excessive number of frames. The time lapse may be captured with or without panning the camera 120.

In one embodiment, the mount platform control logic 113 of the rotating platform 900 may communicate with, and be controlled by, a remote computing device. For example, an application executing on a mobile device or the remote controller used with the aerial vehicle 200 may be used to control operation of the rotating platform 900. Furthermore, in one embodiment, operation of the rotating platform can be controlled via the attached camera 120. For example, the rotating platform 900 may begin rotating automatically when the camera 120 is configured to operate in a panoramic mode and image or video captured is initiated. The camera 120 may itself be controlled by another remote device such as a mobile computing device or remote control, and the camera relays relevant instructions to the rotating platform 900 via a connection through the gimbal 100 to control its operation.

In another embodiment, the rotating platform 900 may control one or more functions of the camera 120. For example, the rotating platform 900 may cause the camera 120 to begin recording or take a picture when the rotating platform 900 begins rotating or when it reaches certain angles in its rotational path. Furthermore, the rotating platform 900 may cause the camera 120 to configure itself in a particular mode (e.g., a panoramic mode) suitable for operation with the rotating platform. In one embodiment, control signals from the rotating platform 900 to the camera 120 may be sent via a wired interface through the gimbal 100. In another embodiment, the rotating platform 900 may communicate wirelessly with the camera 120. In yet another embodiment, the rotating platform 900 may communicate with a mobile computing device executing an application that in turns controls operation of the camera 120.

FIGS. 10A, 10B, 10C, and 10D are block diagrams that illustrate example methods for controlling the motor in the base 910 of the rotating platform 900 and one or more motors in the gimbal 100 to control the orientation of the camera 120 coupled to the gimbal 100 to track an object. The control methods illustrated in FIGS. 10A, 10B, 10C, and 10D may be implemented by a combination of the gimbal control system 150 and the motors in the gimbal 100 and rotating platform 900. The orientation of the camera 120 may be controlled along a specific axis. The methods shown in in FIGS. 10A, 10B, 10C, and 10D may be implemented by the rotating platform 900 and gimbal 100 shown in FIG. 9 to control the yaw of the camera 120. For example, in an embodiment, the control method includes detecting a position of an object to be tracked relative to an orientation of the camera, determining a desired motion and/or position (e.g., a motion state) of the camera suitable for tracking the object and current motion and/or position of the camera. The motor of the rotating platform, the gimbal are both are then controlled depending on the current and desired motions and/or positions to reduce a difference between the current motion and/or position and the desire motion and/or position. Herein, the control methods are discussed with respect to the first motor 301 of the gimbal 100. However, the control methods might be employed with respect to other gimbal motors in an embodiment in which a different motor configuration to that of gimbal 100 is mounted on the rotating platform 900.

The control methods illustrated in FIGS. 10A, 10B, and 10C, and 10D make reference to the angular velocity of the motor of the rotating platform 900, $\omega_{RP}$, the angular velocity of the first motor 301 of the gimbal 100, $\omega_G$, and the angular velocity of the camera 120, $\omega$. The angular velocity of a motor denotes the angular velocity of the shaft of the motor relative to the rest of the motor. The angular velocity of the camera 120, $\omega$, denotes the yaw component angular velocity only. Thus, it should be evident that $\omega_{RP}+\omega_G=\omega$. The angular velocity of either motor ($\omega_{RP}$ or $\omega_G$) can be detected by, for example, a rotary encoder coupled to the shaft of the motor or detecting the angular velocity with a gyroscope or accelerometer. The gimbal control system 101 may also change $\omega_G$ or $\omega_{WP}$ by modulating the power delivered to the corresponding motor or by changing the setpoint of a PID which controls the corresponding motor. The angular velocity of the camera 120, $\omega$, may be detected by orientation sensors, accelerometers, gyroscopes, or magnetometers in the camera or the IMU in the gimbal 100. Alternately, the angular velocity of the camera 120, $\omega$, may be detected by the sensor unit 101 on the gimbal 100. Rather than detecting each value in the set $\{\omega_{RP}, \omega_G, \omega\}$ directly, one value can be detected indirectly if the other two have been detected using the relation $\omega_{RP}+\omega_G=\omega$ (e.g., if $\omega_G$ and $\omega$ are detected, $\omega_{RP}$ can be calculated as $\omega_{RP}=\omega-\omega_G$). Each of the described processes may be repeated periodically or when a change in motion is detected so as to continuously control motion of the camera 120 to track the object.

Figure 10A:
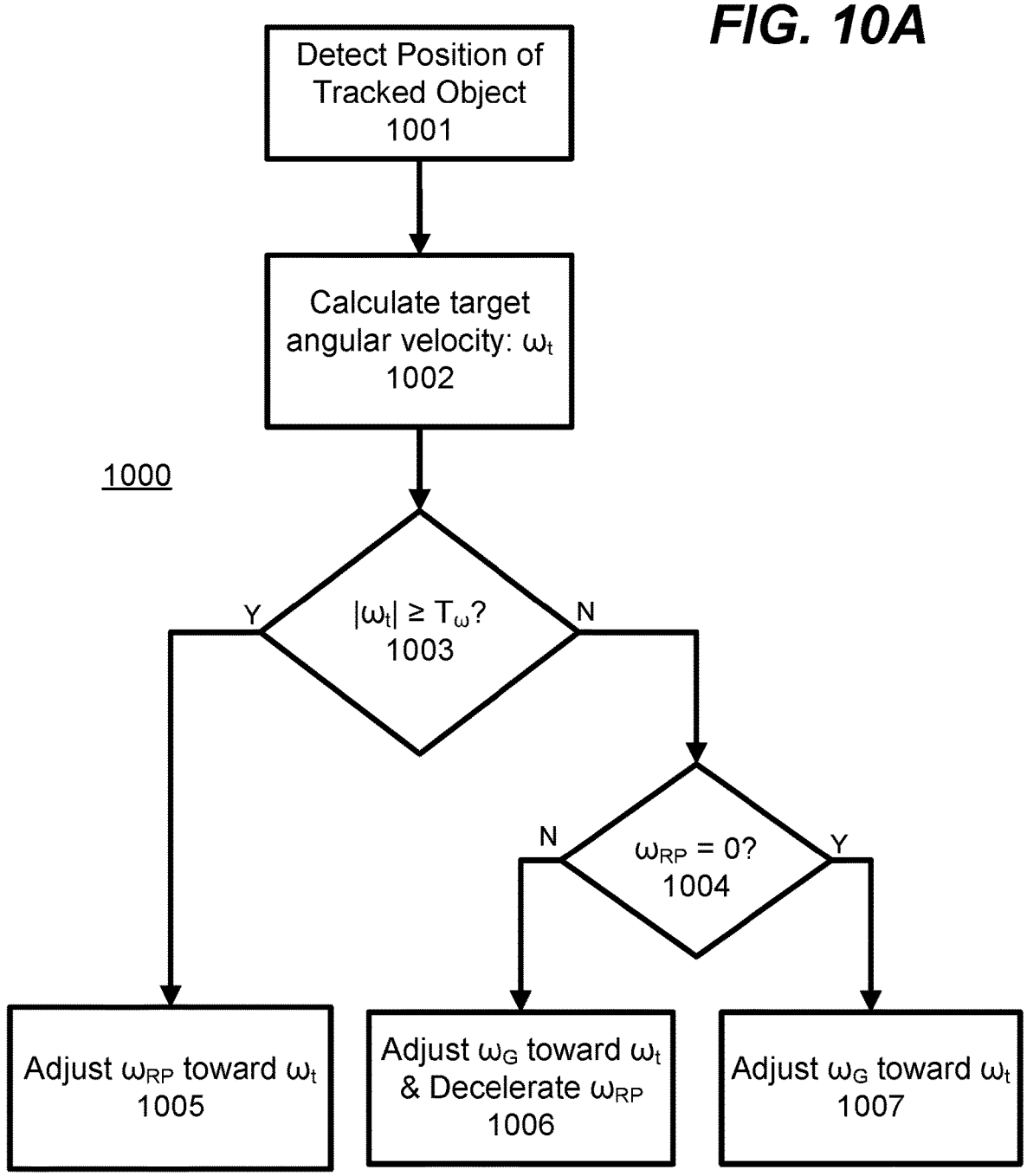
FIGS. 10A, 10B, 10C, and 10D are block diagrams that illustrate example methods for tracking an object with a camera coupled to a gimbal mounted on a rotating platform.

FIG. 10A is a block diagram illustrating a control method for allowing the camera 120 to track a moving object. In the illustrated example method, the first step of the control method 1000 is detecting 1001 the position of a tracked object. Types of tracked objects and algorithms suitable for tracking said objects will be further discussed herein. The position of the tracked object may be a target object angular position, $\theta_{TO}$, wherein the target object angular position is the angle of the displacement direction between the camera 120 and the tracked object. Detecting and locating the tracked object to estimate the tracked object position, $\theta_{TO}$ may use, for example, an object recognition algorithms applied to images captured by the camera 120, one or more GPS receivers, a directional microphone system, or some combination thereof.

In the illustrated example method, the gimbal control system 150 calculates 1002 a target angular velocity, $\omega_t$, for the camera 120. The target angular velocity, $\omega_t$, may be based on the orientation of the camera 120, the displacement direction between the camera 120 and the tracked object, the present angular velocity of the camera 120, and the angular velocity of the tracked object (denoted herein as $\omega_{TO}$). The angular velocity of the tracked object, $\omega_{TO}$, is defined relative to the camera 120 and is an estimate of the rate of change of the direction of the displacement vector between the camera 120 and the tracked object. $\omega_{TO}$ may be estimated based on the difference between the current position of the tracked object and the previous position. $\theta_{TO}$ and $\omega_{TO}$ both relate only to the yaw axis (i.e., to movement of the tracked object in the horizontal plane). The target angular velocity, $\omega_t$, may be calculated via a control algorithm using the displacement direction between the camera 120 and the tracked object as a setpoint for the yaw of the camera 120 and $\omega_{TO}$ as the setpoint for the angular velocity of the camera 120.

In some embodiments, tracking an object from a received sensor input may be associated with a delay, $\delta$. For example, if an object is tracked with machine vision algorithms applied to images captured by the camera 120, the machine vision algorithms may take $\delta$ seconds to locate the object in an image. To compensate for this delay, $\theta_{TO}$ may be calculated from the delayed target object angular position, $\theta_\delta$. For example, $\theta_{TO}$ may be calculated as $\theta_{TO}=\delta_\delta+\delta^*\omega_{TO}$, where $\omega_{TO}$ is calculated by comparing the current value of $\theta_\delta$ to the previously detected value of $\theta_\delta$.

The gimbal control system 150 checks whether $|\omega_t|\geq T_\omega$ 1003, where $|x|$ denotes the absolute value of x. $T_\omega$ is a threshold value for the angular speed of the camera 120. For example, the threshold value $T_\omega$ may comprise a predefined or dynamically configured target angular velocity. In alternate embodiments, the detected angular speed of the camera 120, $\omega$, is compared to a threshold in place of $\omega_t$. If $|\omega_t|\geq T_\omega$, $\omega_{RP}$ may be adjusted 1005 toward $\omega_t$, where $\omega_{RP}$ denotes the angular velocity of the motor of the rotating platform 900. Adjusting 1005 $\omega_{WP}$ toward $\omega_t$ comprises detecting the present value of $\omega_{RP}$ using, for example, a rotary encoder coupled to the shaft of the motor of the rotating platform 900. Adjusting 1005 $\omega_{RP}$ toward $w_t$ further comprises accelerating or decelerating the motor of the rotating platform 900 to match $\omega_{RP}$ to $\omega_t$. $\omega_{RP}$ can be matched to $\omega_t$ using a control system, such as a PID controller, with $\omega_{RP}$ as the measured value and $\omega_t$ as the setpoint of the control system. Furthermore, in one embodiment, $\omega_G$ (denoting the angular velocity of the first motor 301 of the gimbal 100) is also controlled to more precisely match $\omega$ to $\omega_t$.

If $|\omega_t|$ is less than $T_\omega$, then the gimbal control system 150 may check whether $\omega_{RP}=0$ 1004, where $\omega_{RP}$ denotes the angular velocity of the motor of the rotating platform 900. If $\omega_{RP}=0$ (i.e., if the motor of the rotating platform 900 is stationary), the gimbal control system 150 may adjust 1007 $\omega_G$ toward $\omega_t$, where $\omega_G$ denotes the angular velocity of first motor 301 of the gimbal 100. Otherwise, if $\omega_{RP}\neq 0$, the gimbal control system may adjust 1006 $\omega_G$ toward $\omega t$ while decelerating $\omega_{RP}$.

The example control method 1000 illustrated by FIG. 10A relies on the first motor 301 of the gimbal 100 to maintain the orientation and angular velocity of the camera 120 while the magnitude of the target angular velocity (i.e., $|\omega_t|$) is less than a threshold value, $T_\omega$. While $|\omega_t|<T_\omega$, the motor in the rotating platform 900 is decelerated until it is stopped. If $|\omega_t|>T_\omega$, the gimbal control system 150 relies on the motor of the rotating mount 900 to maintain the orientation and angular velocity of the camera 120 while the first motor 301 of the gimbal 100 is used to supplement the motor of the rotating mount 900 to make tracking more precise. Thus, the control method 1000 is a control scheme in which the first motor 101 of the gimbal 100 is preferentially used when the tracking rotation speed is small, but is supplemented by the motor of the rotating platform 900 to avoid undue strain on the first motor 101 of the gimbal 100. A control method such as control method 1000, may be advantageous in embodiments in which the motors of the gimbal 100 are more precise than the motor of the rotating mount 900. Control method 1000 may also be advantageous in embodiments in which operation of the motor of the rotating mount 900 produces significant vibration for the camera 120.

Figure 10B:
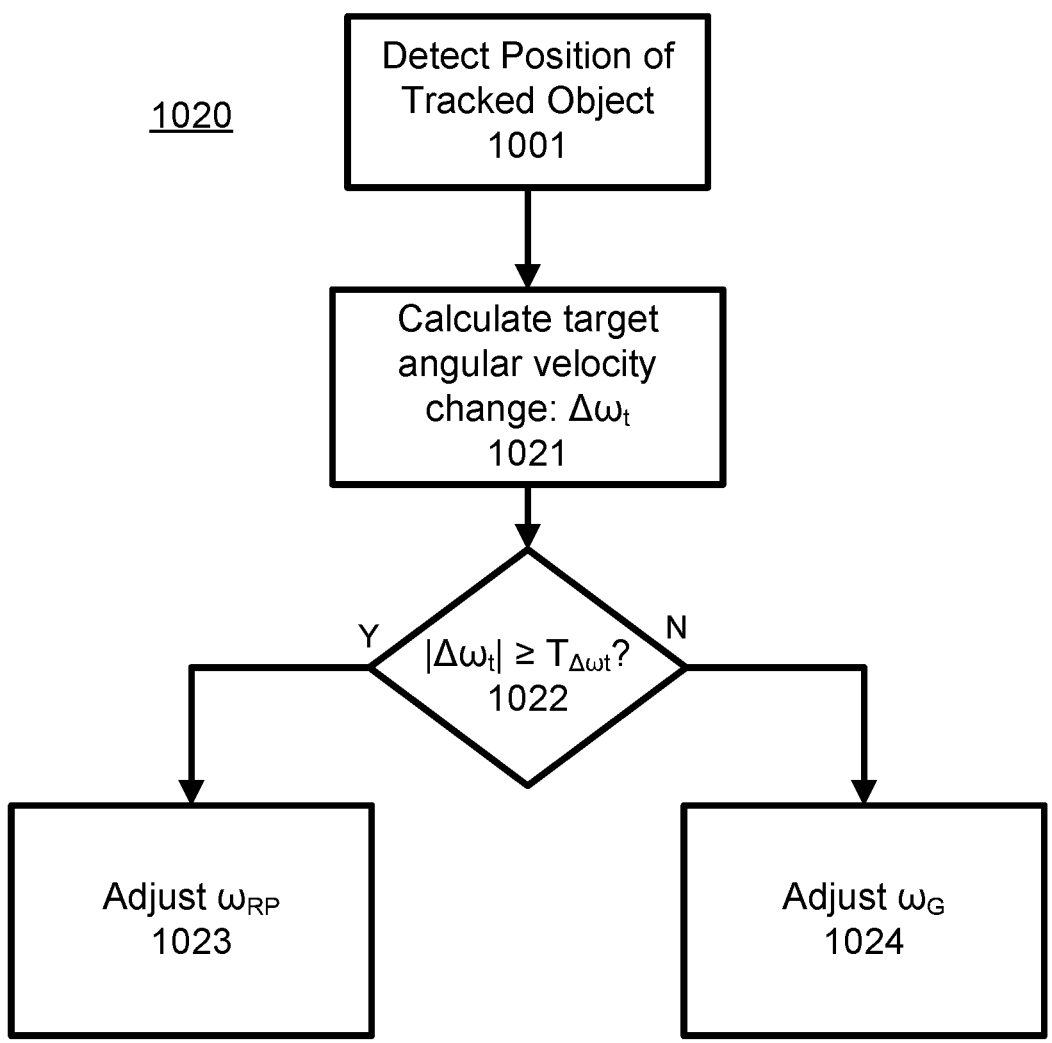

FIG. 10B illustrates a second control method 1020. The control method 1020 detects 1001 the position of the tracked object. Based on the position of the tracked object, the gimbal control system 150 calculates 1021 a target angular velocity change, $\Delta\omega_t$. The target angular velocity change, $\Delta\omega_t$, may be calculated as $\Delta\omega_t=\omega-\omega_t$, where $\omega$ is the current angular velocity of the camera 120, and $\omega_t$ is the target angular velocity as discussed in relation to control method 1000.

The gimbal control system 150 compares $\Delta\omega_t$ to a threshold value, $T_{\Delta\omega t}$, to determine if $|\Delta\omega_t|\geq T_{\Delta\omega t}$ 1022. If $|\Delta\omega_t|<T_{\Delta\omega t}$, the gimbal control system 150 may adjust 1024 the angular velocity of the first motor 301 of the gimbal 100, $\omega_G$, while the angular velocity of the rotating platform 900, $\omega_{RP}$, remains constant. If $|\Delta\omega_t|\geq T_{\Delta\omega t}$, the gimbal control system 150 may adjust 1023 the angular velocity of the motor of the rotating platform 900, $\omega_{RP}$. In some embodiments, $\omega_G$ is also adjusted when $|\Delta\omega_t|\geq T_{\Delta\omega t}$. The second control method 1020 thus keeps the angular velocity of the rotating platform 900, $\omega_{RP}$, constant while $|\Delta\omega_t|$ is small and accelerates the motor of the rotating platform 900 when it is needed to compensate (i.e., when $|\Delta\omega_t|\geq T_{\Delta\omega t}$). Thus, the second control method 1020 may be used to set a maximum angular acceleration (e.g., $T_{\Delta\omega t}$) for the first motor 301 of the gimbal 100.

Figure 10C:
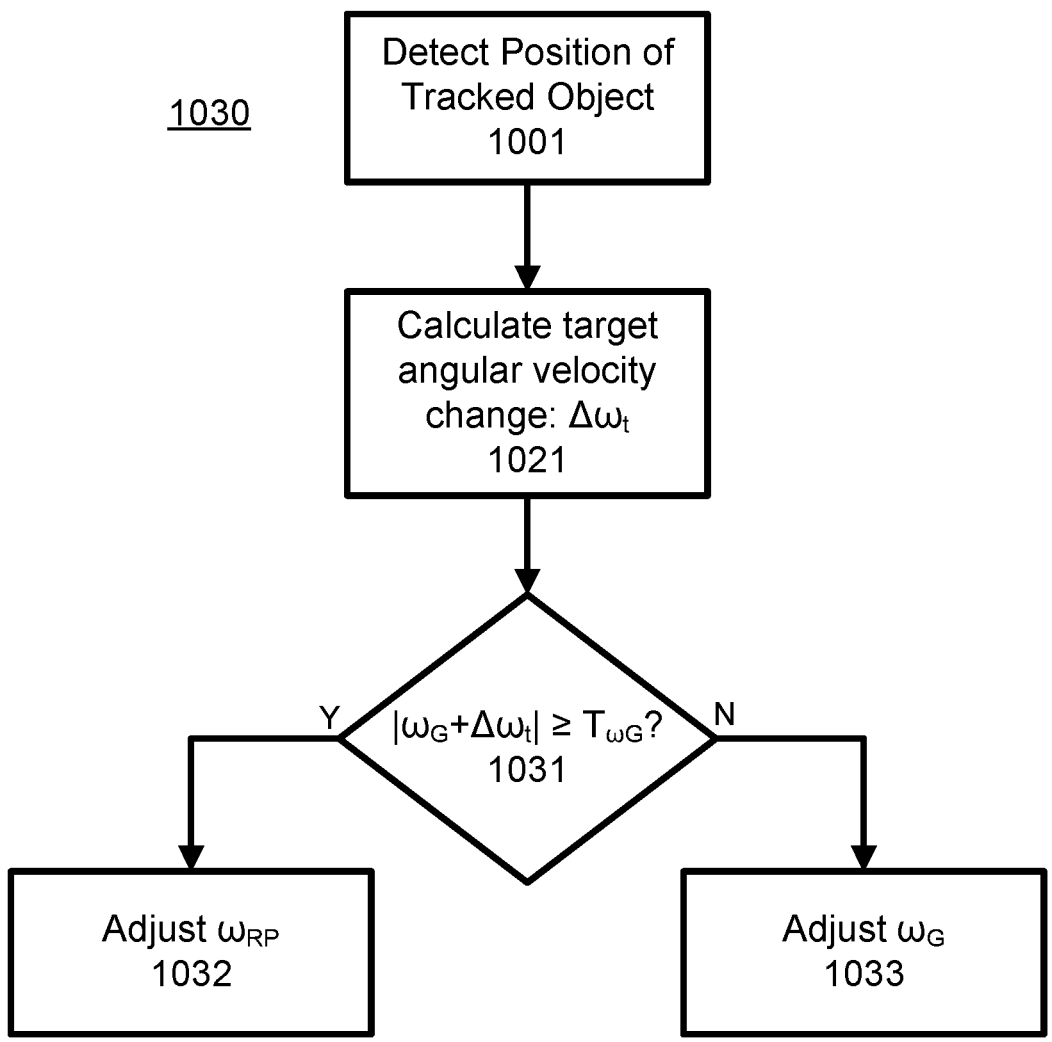

FIG. 10C illustrates a third control method 1030. The third control method 1030 first detects 1001 the position of the tracked object. Based on the position of the tracked object, the gimbal control system 150 calculates 1021 a target angular velocity change, $\Delta\omega_t$. The angular velocity of the first motor 301 of the gimbal 100, $\omega_G$, and $\Delta\omega_t$ are summed. This sum is compared to a threshold value, $T_{\Delta\omega G}$, to determine if $|\omega_G+\Delta\omega_t|\geq T_{\Delta\omega G}$ 1022. If $|\omega_G+\Delta\omega_t|<T_{\Delta\omega G}$, the gimbal control system 150 may adjust 1033 the angular velocity of the first motor 301 of the gimbal 100, $\omega_G$, while the angular velocity of the rotating platform 900, $\omega_{RP}$, remains constant. If $|\omega_G+\Delta\omega_t|\geq T_{\Delta\omega G}$, the gimbal control system 150 may adjust 1032 the angular velocity of the motor of the rotating platform 900, $\omega_{RP}$. In some embodiments, $\omega_G$ is also adjusted when $|\omega_G+\Delta\omega_t|<T_{\Delta\omega G}$. The third control method 1030 thus keeps the angular velocity of the rotating platform 900, $\omega_{RP}$, constant while $|\omega_G+\Delta\omega_t|$ is small and accelerates the motor of the rotating platform 900 to prevent the $\omega_G$ from becoming too large (i.e., when $|\omega_G+\Delta\omega_t|\geq T_{\Delta\omega G}$). Thus, the third control method 1030 can be used to set a maximum angular velocity (e.g., $T_{\Delta\omega G}$) for the first motor 301 of the gimbal 100.

Figure 10D:
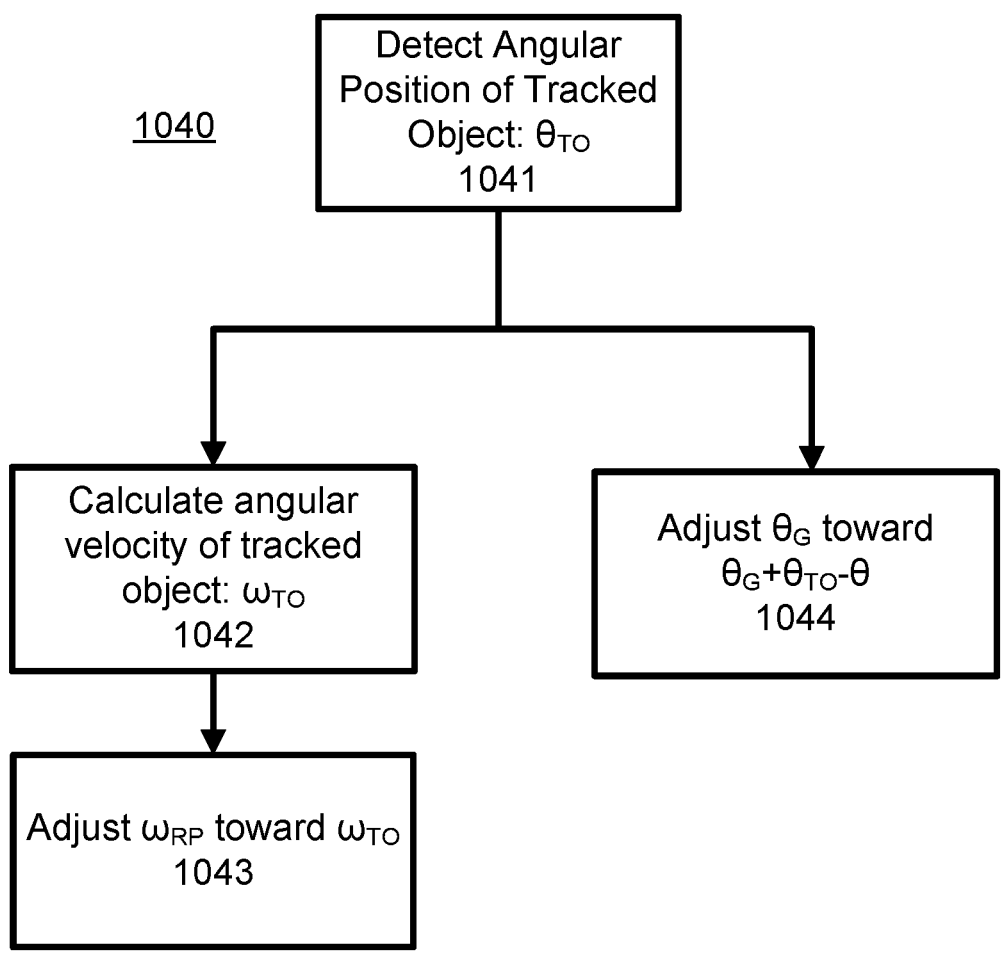

FIG. 10D illustrates a fourth control method 1040. This control method 1040 detects 1041 the angular position of the tracked object, $\theta_{TO}$. The angular position of the tracked object, $\theta_{TO}$, may be used to calculate 1042 the angular velocity of the tracked object, $\omega_{TO}$. The angular velocity of the motor of the rotating platform 900, $\omega_{RP}$, may be adjusted 1043 toward $\omega_{TO}$. The angular position of the first motor 301 of the gimbal 100, $\theta_G$, may be adjusted toward $\theta_G+\theta_{TO}-\theta$, where $\theta$ denotes the current angular position of the camera 120. It is noted that $\theta_G+\theta_{TO}-\theta=\theta_{TO}-\theta_{RP}$. The control method 1040 may compensate for the acceleration or the deceleration of the motor of the rotating platform 900 when adjusting 1044 $\theta_G$ toward $\theta_G+\theta_{TO}-\theta$. Accordingly, the orientation of the camera, $\theta$, is adjusted toward OTO. Thus, in the fourth control method 1040, the rotating platform 900 may be used to track the movement in the tracked object and the gimbal 100 corrects drift to fix the orientation of the camera 120, $\theta$, to the angular position of the tracked object, $\theta_{TO}$. The control method 1040 tracks the tracked object by implementing "broad" tracking with the rotating mount platform 900 and "precise" tracking with the first motor 301 of the gimbal 100.

Pole Mount Apparatus

Figure 11:
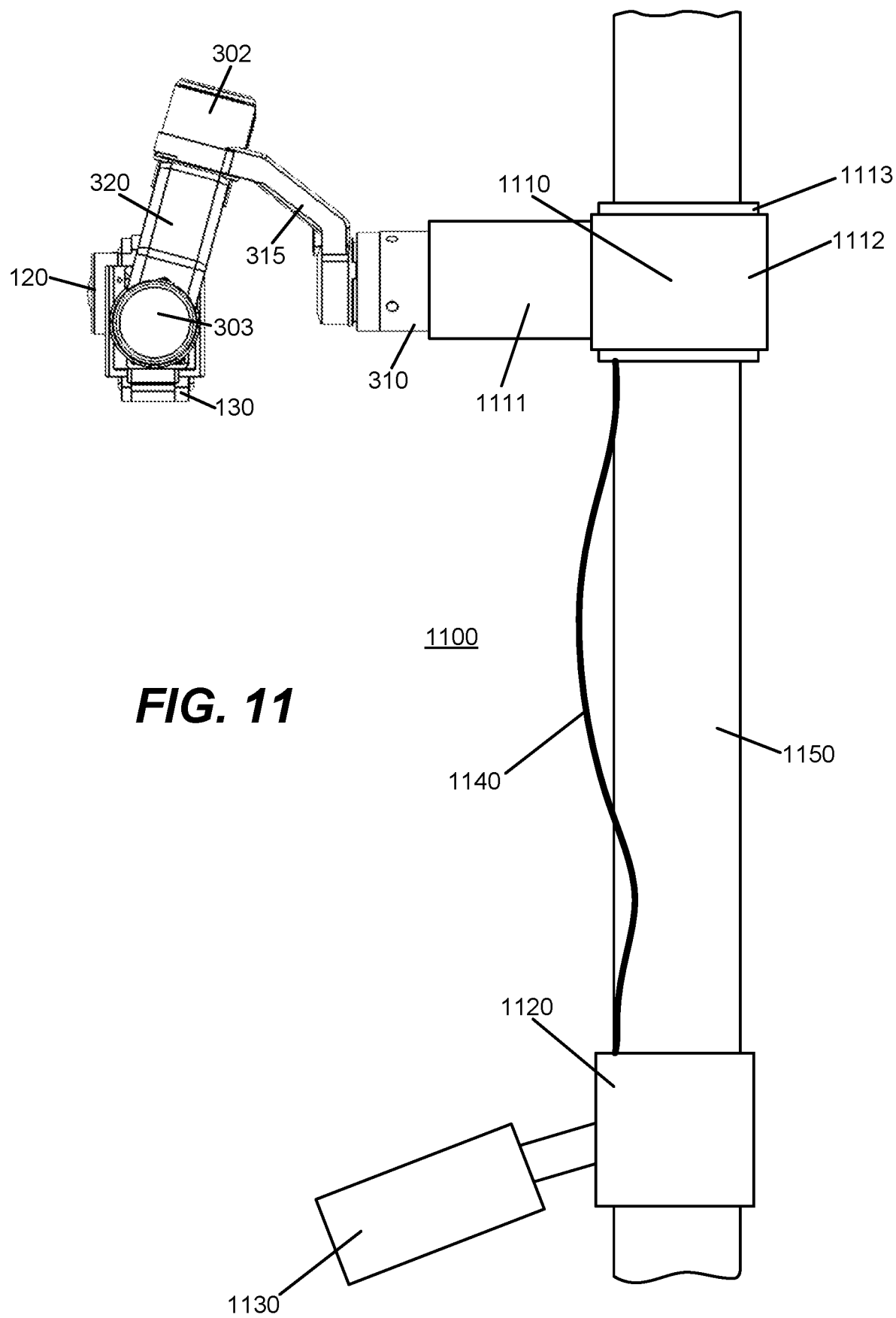
FIG. 11 illustrates an example of a gimbal coupled to a pole mount apparatus.

FIG. 11 illustrates an example embodiment of a gimbal 100 coupled to a pole mount apparatus 1100. The pole mount apparatus 1100 consists of an upper clamp 1110, a lower clamp 1120, a controller 1130, and a cable 1140. The two clamps 1110, 1120 are removably coupled to a pole 1150. The cable 1140 electrically connects the upper and lower clamps 1110, 1120. The upper clamp 1110 comprises a connection housing 1111, an outer shell 1112, and an inner shell 1113. The gimbal 100 can be removably coupled to the upper clamp 1110. The mount connector 304 of the gimbal 100 couples to a reciprocal coupling end in the connection housing 1111. The lower clamp 1120 can be coupled to the controller 1130.

In some embodiments, the upper clamp 1110 is equipped with at least one electric motor, which rotates the connection housing 1111 and the outer shell 1112 about the axis of the pole 1150. The inner shell 1113 may remain rigidly coupled to the pole while the outer shell 1112 rotates. In this configuration, the gimbal 100 can continuously rotate about the pole 1150 without twisting the cable 1140 connecting the upper clamp 1110 to the lower clamp 1120, which is coupled to the inner shell 1113. In alternate embodiments, the upper clamp 1110 comprises a single shell and when locked to the pole 1150 cannot rotate.

In some embodiments, the clamps 1110, 1120 are not removable from the pole 1150. As such embodiments, the two clamps 1110, 1120 can be locked onto the pole 1150, which prevents them from being moved. The clamps 1110, 1120 can be unlocked which allows them to slide up and down the pole 1150, but not detached from the pole 1150. In some embodiments, the clamps 1110, 1120 can also be rotated around the pole 1150 when unlocked. In some embodiments, the lower clamp 1120 is rigidly coupled to the pole 1150 and cannot be unlocked, shifted vertically, or rotated without the use of tools. In alternate embodiments, the lower clamp 1120 is omitted entirely and the controller 1130 is connected directly to the pole 1150. In some embodiments, the upper clamp 1110 is omitted and the mount connector 304 of the gimbal 100 couples directly to a corresponding connector on the pole 1150. In some embodiments, the height of the pole 1150 is adjustable.

In some embodiments, at least one of the clamps 1110, 1120 has a first locking mechanism which enables the clamp to move up and down the pole 1150 or to detach from the pole 1150 entirely and a second locking mechanism which enables the clamp to be rotated about the pole 1150. The upper clamp 1110 can have a locking mechanism which when locked or unlocked, serves to fix the rotation of the outer shell 1112 or allow for rotation of the outer shell 1112, respectively. In some embodiments, the lower clamp 1120 is always free to rotate. In some embodiments, the clamps 1110, 1120 are capable of coupling to poles having a range of thicknesses.

The controller 1130 allows for user input to the control the operation of the camera 120, the gimbal 100, or the rotation of the outer shell 1110. The controller 1130 may include a display that provides for display of video or images captured by the camera 120. The controller 1130 can receive an input from a user through buttons, switches, or a touch screen and transmit an instruction to the camera 120 to perform an action. This can be an instruction to take a picture or a burst of pictures, begin recording a video, terminate the recording of a video, toggle the mode of the camera 120 between a video mode and a picture mode, toggle the power of the camera 120, change the mode of the camera 120 so that it takes bursts of pictures rather than a single picture, change the frame rate at which the camera 120 records videos, change the resolution or compression rate at which pictures or videos are recorded. The controller 1130 can also receive input from a user to trigger the gimbal 100 or upper clamp 1110 to perform an action. For example, after receiving an input from a user, the controller 1130 can transmit a command to the gimbal 100 to change the orientation of the camera 120, or transmit a command to the upper clamp 1110 to rotate. In some embodiments the controller 1130 receives power from an internal battery or an external power source and provides power through the cable 1140 to the gimbal 100, the motor of the upper clamp 1110, or the camera 120. In some embodiments, the controller 1130 contains a mount platform control logic unit 113 which is part of the gimbal control system 150 which controls the movement of the gimbal 100. The control logic 114 may implement a tracking method, such as control methods 1000, 1020, 1030, 1040. It is noted that control methods 1000, 1020, 1030, 1040 may be implemented using a combination of the second and third motors 302, 303 of the gimbal 100 and an electric motor in the upper clamp 1110 to track the horizontal movement of a tracked object.

Unlike the handheld grip 600 or aerial vehicle 200, the pole mount apparatus 1100 is not expected to move. Consequently, the gimbal control system 150 can leave the roll of the camera 120 fixed, rather than continuously parsing data from the sensor unit 101 of the gimbal 100 in order to detect changes. If the gimbal 100 is not actively tracking an object, then it may be advantageous to fix all of the motors 301, 302, 303 of the gimbal 100. Alternately, the gimbal control system 150 can operate using reduced complexity or with a lower frequency of receiving input from the sensing unit 101. These simplifications can result in reduced computational complexity and power consumption for the gimbal control systems 150.

In some embodiments, the cable 1140 provides a wired connection which allows for communication between the controller 1130 and the gimbal 100 or the camera 120. The cable 1140 can transmit commands input by a user into the controller 1130 to the gimbal 100, the camera 120, or the upper clamp 1110. The controller 1130 may also receive captured images or video from the camera 120 through the cable 1140. A gimbal control logic unit 102 and a sensor unit 101 on the gimbal 100 can communicate through the cable 1140 with control logic unit 13 on the controller 1130 in order to provide for control of the gimbal 100. In some embodiments, the cable is internal to the pole 1150. In yet other embodiments, the cable 1140 could be replaced with a wireless communication connection, e.g., Bluetooth.

In some embodiments, the cable 1140 retracts into the upper clamp 1110 or lower clamp 1120. For example, a button on the lower clamp 1120 can cause the cable 1140 to be automatically retracted into the lower clamp. In this manner a user can easily mitigate excess cable slack.

In some embodiments, the cable 1140 is omitted and the controller communicates wirelessly with the gimbal 100 or the camera 120. In some embodiments, the controller 1130 is not attached to the rest of the pole mount apparatus 1100, and function as a wireless remote controller. In some embodiments, the controller 1130 includes a network interface which allows for communication with a network such as a Wi-Fi network. The controller 1130 may receive commands or transmit images and video over the network to a second device.

Tracking Objects

In some embodiments, the preferred orientation of the camera 120 is defined using one or more tracking algorithms, which can be used to track an object. Tracking can be done via a machine vision algorithm using images captured by the camera 120, where the machine vision algorithm identifies and locates the object in the captured images. In this case, there is a conversion from a camera reference frame (e.g., the camera 120), to host (e.g., the aerial vehicle) reference frame. The gimbal 100 is given a setpoint in the host reference frame such that the tracked point is in camera view (e.g., with respect to the camera 120 used for video).

Tracking can also be done via a GPS receiver, wherein the GPS receiver is tracked by the camera 120. If a user is carrying a GPS enabled tracker or similar localization device, the user location will most likely be in an earth (global) reference frame. The gimbal 100 setpoint is in a local (e.g., that of the mount platform 110) reference frame. The mount platform 110 can have a navigation module that combines several sensors to calculate its own position in a global reference frame. The mount platform 110 converts user coordinates (e.g., global reference frame) into a gimbal setpoint (e.g., local reference frame) such that the object is in the view.

GPS tracking is in general, only accurate to within a few meters. Consequently, GPS tracking can be used in conjunction with another form of tracking to provide for more accurate tracking. In one embodiment, information from a GPS tracker and a GPS receiver on a mount platform 110 can be used to provide an estimated position of the GPS tracker, relative to the mount platform 110. A processor on the mount platform 110 or the gimbal 100 can calculate a range of angles from the camera, in which the tracked object can be expected to be. This range of angles can be calculated based on an a priori estimate of GPS accuracy, a quality metric for the GPS signals received, and the distance between the mount platform 110 and the GPS tracker. This range of angles corresponds to a certain area of an image captured by a camera. A machine vision system can parse an image or set of images received from the camera 120. By limiting the machine vision algorithm to the area determined based on the range of angles, the computation expenditure needed to detect the object with the machine vision system can be reduced and the accuracy can be improved. In another embodiment, the machine vision system examines the entire image received from the camera 120, but uses the GPS information in a probabilistically method to determine which of several candidate objects to track. Combining GPS and machine vision tracking can achieve better performance than either system in isolation.

A tracked object can also be an audio source, a source radiating an electromagnetic signal, a device communicatively coupled with the mount platform 110, or an object identified by a machine vision system. The tracked object can be detected using appropriate sensors on either the camera 120 or the mount platform 110, and one or more processors on the camera 120 or the mount platform 110 calculates the position of the tracked object relative to the mount platform 110. Calculating the position of the tracked object relative to the mount platform 110 may involve calculating the position of the tracked object relative to the camera 120 and converting the position to the reference of the mount platform 110. The position of the tracked object relative to the mount platform 110 can be used by the gimbal control system 150 to generate a setpoint (e.g., a preferred position) for the gimbal 100, defined so that the camera 120 is oriented to face the tracked object. The position of the tracked object relative to the mount platform 110 might be such that the camera 120 cannot be oriented to face the tracked object due to the mechanical limitations of the gimbal 100 or due to the gimbal 100 or the mount platform 110 obstructing the view of the camera 120. In such a situation, the setpoint of the gimbal 100 can be set to a default orientation or the gimbal control system 150 can use a setpoint so that the camera 120 is oriented at an orientation as close as possible to the ideal orientation.

In some embodiments, the user is able to define a tracked object which the camera 120 tracks via a machine vision object tracking algorithm. A video feed from the camera 120 or from a camera on the mount platform 110 can be transmitted to, for example, a remote controller (e.g., a dedicated controller with a display, a smartphone, or a tablet) for display to the user (e.g., on a screen of a remote controller which is communicatively coupled to the aerial vehicle 200 coupled to the gimbal 100). In addition, through the remote controller the user can select an object (e.g., by tapping the object on a touchscreen) which selects the object as the tracked object. A machine vision system can recognize a plurality of objects in the video feed of the camera 120 using an object classifier (e.g., a facial recognition system, a classifier configured to recognize people, or a generic classifier which can be trained to recognize a generic object) and display an indicator on the video feed which indicates to the user that the object is available for tracking.

Once a tracked object is selected, a machine vision object tracking algorithm can be used to orient the camera 120 so that the tracked object is centered in the frame of the video. The machine vision algorithms can be used to identify and track objects can be performed by one or more processors on the camera 120, the mount platform 110, a remote controller device communicatively connected to a remote controlled vehicle to which the gimbal 100 is mounted, or a remote server connected to the mount platform 110 via a network.

The gimbal 100 can also be configured to track an audio source, based on the directionality of the audio source. The camera 120 or mount platform 110 can include a multiplicity of audio receivers (e.g., an acoustic-to-electric transducer or sensor) which can be used to record sound from an audio source and to estimate the directionality of the sound based on the relative delay between the spatially diverse audio receivers. The gimbal 100 can track any sound over a certain decibel level, or with a certain energy within a given frequency range, or that match an audio profile of a user which can be assessed using vocal recognition algorithms. In an example embodiment, an audio output device carried by a user can emit sound at an ultrasonic or infrasonic frequency (i.e., outside the threshold of human hearing), and this audio output device can be tracked by detecting the sound emitted by the audio output device. Additionally, the tracked object can be a GPS tracker that is communicatively coupled to the mount platform 110. The location device can detect its own coordinates via a GPS receiver and transmit the coordinates to the mount platform 110. The mount platform 110 can then calculate the position of the GPS tracker relative to itself using a navigation module that also includes a GPS. In some embodiments, a handheld remote controller used to control the mount platform 110 functions as the GPS tracker.

In some embodiments, a mount platform 110 may include sensors for tracking an object. For example, a mount platform can include lidar, radar, or sonar. Information from a mount platform 110 sensors can be used in conjunction with captured images or video from a camera 120 to track an object. For example, machine vision algorithms can be used to identify an object and lidar can be used to continually track the object. Processing images captured by the camera 120 with machine vision algorithms can be used to supplement this continuous tracking. For example, a machine vision processing system can process one frame in every N captured video frames in order to determine that the lidar system is still correctly tracking the object. Alternately, the machine vision algorithm implemented by the mount platform 110 during continuous tracking may be continuous but may be of lower computational complexity the algorithm used to initially identify an object. In addition, when the lidar tracking system is determined to be unreliable (e.g., when tracking of the object is lost, when the tracked object appears to jump suddenly to a new location, when the tracked object appears to quickly change speeds, when the tracked object appears to change size, etc.), the machine vision algorithm may be again be used to reacquire the object for tracking.

Each of the aforementioned tracking schemes can allow the camera 120 to continuously track an object, such as a user, as the tracked object moves around and as the mount platform 110 moves around and rotates. In some embodiments, multiple tracking schemes can be combined to better track an object. In some embodiments, multiple tracking schemes are supported by the gimbal control system 150, and the user is able to select between tracking schemes.

For a mount platform 110 which incorporates motors, such as the rotating platform 900 and the pole mount apparatus 1100, tracking can utilize the motor of the mount platform 110 and the motors 301, 302, 303 of the gimbal 100 together. For example, a motor in the pole mount apparatus 1100 which rotates the outer shell 1112 of the upper clamp 1110 can be used for large yaw rotations and the motors 301, 302, 303 of the gimbal 100 can be used when only small yaw rotations are desired. In some embodiments, the motor of the mount platform 110 can be restricted to large, sweeping motions, and the motors of the gimbal motors 301, 302, 303 can be used for rapid adjustments to facilitate tracking. For example, an upper bound and lower bound can be placed on the rate of change of the mount platform's angular velocity.

In some embodiments, the gimbal control system 150 has a plurality of modes for determining the behavior of the gimbal 100 which can be toggled by a user. In a center frame tracking mode, an object is tracked so that the object is maintained within the center of the frame of the camera 120. In an in-frame tracking mode, the orientation of the camera 120 remains fixed while a tracked object is within the frame being captured by the camera 120, but when the tracked object is near the edge of the frame, the orientation of the camera 120 is adjusted to keep the object within frame. In a contextual tracking mode, there is no specific object tracked, but once an algorithm identifies an object as an object of interest with a machine vision algorithm the object will be continuously tracked. An object can be determined to be an object of interest based on movement of the object (e.g., if an object greater than a specified size has a speed greater than some upper bound), or based on an image classifier (i.e., an object classifier which identifies people). In a fixed-orientation mode, the orientation of the camera 120 relative to a reference frame such as the ground in maintained, but no specific object is tracked. In a scanning mode, the camera 120 is panned continuously in order to locate an object to track. For example, the rotating mount 900 may continuously rotate so that objects within a full 360° can be viewed by the camera 120 and identified by a machine vision system.

In some embodiments, tracking may control movement of the mount platform 110 in addition to that of the gimbal 100. For example, if the gimbal 100 is coupled to a mobile mount platform 110, such as an aerial vehicle 200 or a ground vehicle, the mount platform 110 may follow the tracked object. In an example usage case, a gimbal 100 attached to an aerial vehicle 200 is set to follow a user. As the user moves, the aerial vehicle 200 can follow the user so that the user is always within the frame of the camera 120, leaving a certain distance between the aerial vehicle 200 and the tracked user. A motor on a mount platform 110 that allows for rotation, such as in the rotating platform 900 or the pole mount apparatus 1100 can also be used in conjunction with the gimbal 100 to track an object.

In some embodiments, vibrations are detected. Vibrations can be detected by a mechanical vibration sensor (e.g., one or more piezoelectric sensors) or by identifying blur caused by vibration in images captured by the camera 120. Blur caused by vibrations can be distinguished from motion blur or rotational blur using digital signal processing. The aperture size, the shutter speed, and the luminance of the image can be adjusted based on the level of detected vibration. When a large degree of vibration is detected, the shutter speed can be increased. The aperture size can be increased or the luminance can be adjusted to compensate for the decreased exposure resulting from the increase in shutter speed. Increasing the shutter speed can mitigate the effect of vibration blur, but will result in a more noisy image. In some embodiments, the camera 120 can record video at a higher frame rate in response to vibration.

Video Stabilization

Figure 12:
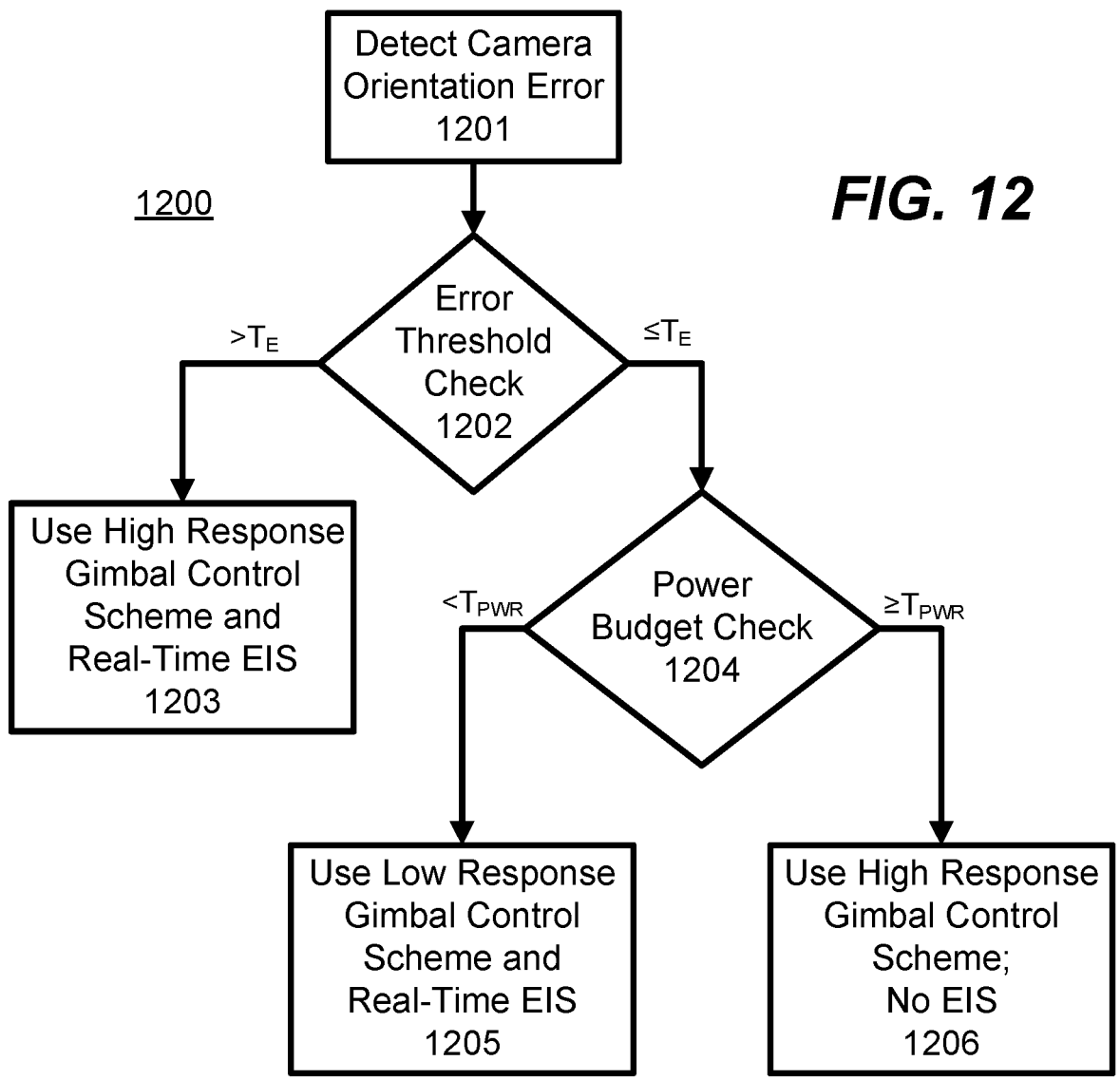
FIG. 12 is a block diagram that illustrates an example method for stabilizing video recorded by a camera attached to mount platform via a gimbal.

FIG. 12 is a block diagram that illustrates an example method for stabilizing the camera 120 with the gimbal 100 mounted on mount platform, such as aerial vehicle 200. The stabilizing method 1200 uses some combination of Electronic Image Stabilization (EIS), a high response gimbal control scheme, and a low response gimbal control scheme. EIS may be performed by processors on the camera 120, the aerial vehicle 200, or some combination thereof. EIS may involve sequential frames of a video being captured along with information indicating the orientation of the camera 120. Sensors 440 on the camera 120 may detect the camera's orientation. In another embodiment, the gimbal 100 may detect this orientation information with sensors of the sensor unit 101 rigidly coupled to the camera 100. The orientation of the camera 120 may also be estimated based on rotary encoders in one or more motors (e.g., 301, 302, 303) of the gimbal 100. The stabilizing method 1200 may be performed by the gimbal control system 150 periodically or continuously (e.g., for every frame of a video).

EIS may involve capturing a frame of video with the camera 120 and cropping the captured frame to a set size (i.e., a set pixel width and height). The larger frames, captured by the camera, are denoted herein as source frames and the cropped frames are denoted herein as stabilized frames. The offset of the cropping may be determined to mitigate the effect of shifting pitch and yaw orientation of the camera 120 on the video. Thus, the sequence of stabilized frames may be shifted so as to counteract movement of the camera 120. Deviations in the yaw and pitch orientation can be counteracted by proportional horizontal and vertical pixel shifts, respectively. In some embodiments, EIS also corrects for deviations in the roll of the camera by rotating the source frames to counteract the roll. The maximum angular deviation that the EIS can correct for is limited by the size of the stabilized frames in comparison to the source frames. If the source frame is large compared to the stabilized frame, EIS can correct for relatively large deviations in the angular orientation of the camera 120. In some embodiments, the gimbal control system 150 is configured to prevent the camera's orientation from exceeding a threshold such that the boundaries of a stabilized frame do not exceed the boundaries of a source frame. In alternate embodiments, EIS interpolates between previously captured frames and the pixels at the edge of a current source frame to generate a stabilized frame with image content that is outside the boundaries of the source frame.

In some embodiments, EIS employs a filter on the source frame to generate the stabilized frame wherein the filter corrects for an image distortion due to the geometry of the camera's optics (e.g., an inverse fisheye filter for a camera 120 with a fisheye lens). In some embodiments, EIS uses multiple detected instances of the camera's orientation captured during the exposure period (i.e., the period of time in which the sensors of the camera 120 are exposed to light) of the frame to correct for motion blur in a frame. The detected "path" of the camera's orientation during the period of exposure may be used to generate a pattern which is the convolutional inverse of the blur produced by the camera's detected movement. This pattern can be convolved with the source frame to generate the stabilized de-blurred frame. In some embodiments, EIS captures multiple source frames, analyzes the source frame to detect motion blur, and composites the best frames into a single stabilized frame.

EIS may be performed in real-time or near-real time. In some embodiments, the requisite information to perform EIS (i.e., the source frame or a cropped version of the source frame and the detected orientation) is stored on a memory of the camera 120 or aerial vehicle 200. EIS may then be performed during post-processing of the video (e.g., on a user's computer after downloading a file containing the source video data and orientation information). Real-time EIS typically uses less non-volatile storage, but uses more processing power. In some embodiments, EIS is performed in both real-time and post-processing. The real-time EIS may involve less computationally expensive operations such as determining the pixel offset for cropping to generate a partially stabilized frame. During post-processing, the partially stabilized frame may be rotated to correct for deviations in the roll of the camera 120. The partially stabilized frame may be also be further cropped, filtered to correct for image distortion due to lenses, and the like.

The gimbal control system 150 may select between a high response control scheme and a low response control scheme. In general, the low response control scheme does not correct deviations between the ideal orientation of the camera 120 and the detected orientation of the camera 120 as quickly as the high response algorithm. Accordingly, the low response algorithm permits more error of the orientation of the camera 120, but generally uses less power. FIG. 12 and the corresponding description describe high response and low response control schemes, but some embodiments do not include this bifurcation. The division between the two control schemes as described herein is intended to illustrate how the gimbal control system 150 can dynamically adjust control of the movement of the gimbal 100 and EIS to stabilize video while optimizing for parameters based on the available power, the current energy stored in the battery of the aerial vehicle 200, the internal temperature of the aerial vehicle 200, channel capacity between the aerial vehicle 200 and the remote controller 720, and processing power available. It will be apparent to one skilled in the art that the gimbal control system 150 may select between more than two control schemes (e.g., a third intermediate control scheme between the high response and low response control schemes). The gimbal control system 150 may also implement a single control scheme which stabilizes video by dynamically adjusting control of the gimbal 100 and EIS to substantially the same effect as multiple control schemes.

In one embodiment, the high response control scheme is an underdamped, and the low power control scheme is overdamped or critically damped. In general, an underdamped control scheme returns the orientation of the camera 120 to a setpoint (e.g., the angular position of a tracked object) more quickly than an overdamped or critically damped control scheme. However, the underdamped control scheme oscillates around a setpoint, whereas an overdamped or critically damped control scheme will not. In some embodiments, the gimbal control system 150 controls at least one of the motors of the gimbal 100 with a PID controller and a underdamped, overdamped, and/or critically damped control scheme is implemented by setting the weights of the proportional, integral, and derivative components of the PID controller. In alternate embodiments, the high response algorithm has a maximum torque, power, acceleration, and/or angular velocity setting for the motor of the gimbal 100 that is higher than that of the low response control algorithm.

Returning to FIG. 12, in the example method, the stabilizing method 1200 detects 1201 the camera 120 orientation error. In this example, the camera 120 orientation error is the difference between a target orientation and a detected orientation of the camera 120. The target orientation may be based on the position of a tracked object or an equilibrium position defined by the gimbal control system 150. The camera orientation error may be checked 1202 against an error threshold $T_E$. Here, the threshold represents a predefined or dynamically selected error value. This error threshold $T_E$ may be compared against the most recently detected camera orientation error, the average camera orientation error within a period of time, the maximum value of the camera orientation error within a period of time, and the like.

The error threshold $T_E$ may be based on the size of the stabilized frames in comparison to the source frames. In some embodiments, the source frames are always the same size for a given camera 120, but the size of the stabilized video is determined by a user. Larger frames of the stabilized video correspond to a smaller error threshold $T_E$. In some embodiments, the error threshold $T_E$ is based on the focal length of the camera 120 such that the error threshold is small for a camera 120 with a large focal length. In some embodiments, the error threshold $T_E$ is based on the shutter speed of the camera 120. A slow shutter speed corresponds to a low error threshold $T_E$. The error threshold $T_E$ may be based on a user configurable setting or a command received at the aerial vehicle 200 from the user. For example, the error threshold $T_E$ may be decreased after receiving a command to capture a picture, capture a burst of pictures, or to start recording video. The error threshold $T_E$ may be decreased if the aerial vehicle 200 is currently using a large amount of power, the current energy stored in the battery of the aerial vehicle 200 is low, the detected internal temperature of the aerial vehicle 200 is high, or some combination thereof.

If the detected orientation error is greater than the error threshold $T_E$, the stabilizing method 1200 may use 1230 a high response gimbal control scheme and real-time EIS. The combination of the high response gimbal control scheme and EIS can maximize the stabilization capabilities of the gimbal 100 and camera, but may also use more power and processing resources. In some embodiments, the combination of the high response gimbal control scheme and EIS is used 1203 when the aerial vehicle 200 performs or is about to perform a maneuver even if the detected error is not greater than the error threshold $T_E$. Such a maneuver may be a change in speed, banking, rotating, changing altitude, landing, lifting off, and the like. Similarly, the combination of the high response gimbal control scheme and EIS may also be used 1203 whenever the speed, acceleration, angular speed, or angular acceleration of the aerial vehicle 200 is greater than some threshold. In some embodiments, the combination of the high response gimbal control scheme and EIS is used

1203 responsive to an estimation by the aerial vehicle 200 of the wind speed or the variance of wind speed.

If the detected orientation error is less than the error threshold $T_E$, the power budget may be checked 1204 against a power budget threshold $T_{PWR}$. The power budget may be determined be dynamically by the gimbal control system 150. The power budget may be low if the aerial vehicle 200 is currently using a large amount of power, the current energy stored in the battery of the aerial vehicle 200 is low, the detected internal temperature of the aerial vehicle 200 is high, or some combination thereof. The power budget may also be determined by current power usage or average power usage with a period of time of the various components of the gimbal system 160 (e.g., processors or rotors 240 of the aerial vehicle 200). The power budget may also be or be determined by a user-configurable setting. If the power budget is less than the power budget threshold $T_{PWR}$, then the stabilizing method 1200 uses the low response gimbal control scheme and real-time EIS. The low response gimbal control scheme uses less power, and the real-time EIS mitigates deviations in the camera's orientation. In some embodiments, instead of real-time EIS, video data is stored in a manner suitable for post-processing EIS, as discussed below in conjunction with FIG. 13. If the power budget is greater than the power budget threshold $T_{PWR}$, the high response gimbal control scheme is used 1260 without EIS. The high response gimbal control scheme uses more power than the low response gimbal control scheme, but generally provides for more stable video. In general, the high response mode produces less motion blur in individual frames than the combination of low response mode and EIS.

In some embodiments, a processing budget check is performed in addition to or instead of the power budget check 1204. The processing budget may be determined based on the availability of computing resources for the aerial vehicle 200, the camera 200, or both. The processing budget may be determined based on the current processor utilization, the currently available random access memory (RAM), the current temperature of one or more processors, or the length of a queue of operations to be performed. The queue of operations to be performed may include data compression operations (e.g., image compression), decoding operations, control algorithms, path planning algorithms for determining a flight path for the aerial vehicle 200, error-correcting coding or decoding, machine visions algorithms (e.g., object detection), and the like. The processing budget may be checked against a processing budget threshold $T_{PRS}$. The processing budget threshold $T_{PRS}$ may be based on the processing load to perform EIS on one or more frames. If the processing budget is greater than the processing budget threshold $T_{PRS}$, the gimbal control system 150 may use 1205 the low response gimbal control scheme and real-time EIS. Conversely, if the processing budget is less than the processing budget threshold $T_{PRS}$, the gimbal control system 150 may use 1206 the high response gimbal control scheme without real-time EIS. In some embodiments, an EIS algorithm is selected from among multiple EIS algorithms, each with different processing requirements, based on the processing budget or power budget. For example, if the processing budget is relatively low, EIS may be performed without a filtering operation to correct for lens distortion. Metadata may be stored with the frame so that this filtering operation may be performed in post-processing.

In some embodiments, the camera 120 includes optical image stabilization (OIS). The camera 120 may include OIS is addition to or instead of EIS. The gimbal control system 150 may dynamically control the combination of OIS, EIS, and movement of the gimbal to stabilize captured video and pictures. For example, OIS may be turned off when the detected error threshold is below a certain threshold (e.g., error threshold 1202). The gimbal control system 150 may also control the aerial vehicle 200 to stabilize the orientation of the camera 120. For example, the aerial vehicle 200 may be controlled to keep the pitch, yaw, and roll within a certain range. The stabilization method 1200 illustrated in FIG. 12 may also be employed by a gimbal control system 150 for a gimbal 100 attached to mount platforms 110 other than an aerial vehicle.

Additional Considerations

The disclosed configuration describes an electronic gimbal 100 capable of being removably connected to multiple different mount platforms, such as aerial vehicles, ground vehicles, handheld grips, rotating mounts, and pole mounts. The disclosed configuration further describes an electronic gimbal 100 capable of removably connecting to multiple different cameras and maintaining the orientation of a camera 120 in space while the mount platform 110 to which the gimbal 100 is attached changes orientation. Moreover, the gimbal 100 can contain an internal bus between the camera 120 and the mount platform 110, which provides for communication. The camera 120 may be removably coupled to a detachable camera frame 130, which, in turn, removably couples to the gimbal 100. The gimbal 100 can also be configured with motors that are not orthogonal, which provides for a greater viewing angle for the camera 120. Tracking algorithms can be implemented by the gimbal 100 and mount platform 110 to track on object with the camera 120 attached to the gimbal. EIS and the movement of the gimbal may be used in combination to stabilize captured images and video.

Also disclosed are mounts to which a gimbal 100 can be removably coupled. A rotating platform 900 includes a motor which may be used in conjunction with the motors 301, 302, 303 in the gimbal to pan the camera 120. A pole mount apparatus 1100 couples to a pole 1150 with upper and lower clamps 1110, 1120. The gimbal couples to the upper clamp 1110 and a controller 1130 which displays video captured by the camera 120 connects to the lower clamp 1120. A handheld grip 600 may couple to the gimbal 100 and includes a number of buttons to control the operation of the camera 120. An aerial vehicle 200, such as a quadcopter, may couple the gimbal 100. The aerial vehicle 200 may wirelessly transmit video captured by the camera 120 to a remote controller 720. The aerial vehicle 200 may include a dampening base to dissipate high frequency vibrations in the gimbal 100 and prevent, to some degree, the gimbal 100 from vibrating, for example, when the aerial vehicle 200 is operational.

The processes and functions described herein attributed to the gimbal 100, camera 120, mount platform 110, pole mount apparatus 1100, aerial vehicle 200, handheld grip 600, or other devices may be implemented via hardware, software, firmware, or a combination of these. In embodiments described herein, each of the above-named devices may include one or more processors and one or more non-transitory computer-readable storage mediums. The non-transitory computer-readable storage mediums may store instructions executable by one or more of the processors that when executed cause the processor to carry out the processes and functions of the respective devices described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the disclosed gimbal ecosystem. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

In additional, additional configurations associated with and/or augmenting those described herein are provided in Appendix A and B, which are included and incorporated by reference within this specification.

What is claimed is:

1. A method, comprising:
    detecting an object relative to an orientation of a camera coupled to a gimbal; and
    controlling a motor of the gimbal by:
        determining a first difference between a velocity of the camera and a target velocity of the camera;
        comparing the first difference to a threshold; and
        responsive to the first difference not exceeding the threshold, adjusting a velocity of the motor of the gimbal to reduce the first difference.

2. The method of claim 1, wherein the velocity of the camera is an angular velocity of the camera, the target velocity of the camera is a target angular velocity of the camera, and the velocity of the motor of the gimbal is an angular velocity of the motor of the gimbal.

3. The method of claim 1, wherein the gimbal is coupled to a rotating platform, further comprising:
    controlling a motor of the rotating platform by:
        responsive to the first difference exceeding the threshold, adjusting a velocity of a motor of the rotating platform to reduce the first difference.

4. The method of claim 3, wherein controlling the motor of the gimbal further comprises:
    responsive to the first difference not exceeding the threshold, determining if the rotating platform coupled to the gimbal is stationary.

5. The method of claim 4, further comprising:
    responsive to determining the rotating platform coupled to the gimbal is stationary, adjusting the velocity of the motor of the gimbal to reduce the first difference.

6. The method of claim 4, further comprising:
    responsive to determining the rotating platform coupled to the gimbal is not stationary, decelerating the rotating platform and adjusting the velocity of the motor of the gimbal to reduce an offset between the velocity of the motor of the gimbal and the target velocity of the camera.

7. The method of claim 3, further comprising:
    summing the velocity of the motor of the gimbal and the first difference to generate a combined velocity;
    comparing the combined velocity to the threshold;
    responsive to the combined velocity exceeding the threshold, adjusting the velocity of the motor of the rotating platform to reduce the first difference; and
    responsive to the combined velocity not exceeding the threshold, adjusting the velocity of the motor of the gimbal to reduce the first difference.

8. The method of claim 3, further comprising:
    detecting a first angular position and a second angular position of the object relative to the orientation of the camera, the first angular position detected at a first time instance and the second angular position detected at a second time instance;
    determining a velocity of the object based on the first angular position, the second angular position, the first time instance, and the second time instance; and
    adjusting the velocity of the motor of the rotating platform to reduce a second difference between a velocity of the rotating platform and the velocity of the object.

9. The method of claim 8, further comprising:
    determining a target angular position of the motor of the gimbal based on an angular position of the motor of the gimbal, the second angular position of the object, and an angular position of the camera; and
    adjusting the angular position of the motor of the gimbal to reduce a third difference between the angular position of the motor of the gimbal and the target angular position of the motor.

10. A non-transitory computer-readable storage medium including instructions that when executed cause a processor to perform operations including:
    determining a first difference between an angular velocity of a camera and a target angular velocity of the camera;
    comparing the first difference to a threshold; and
    responsive to the first difference not exceeding the threshold, adjusting an angular velocity of a motor of a gimbal coupled to the camera to reduce the first difference.

11. The non-transitory computer-readable storage medium of claim 10, further including instructions that when executed cause the processor to perform operations including:
    responsive to the first difference not exceeding the threshold, determining if a rotating platform coupled to the gimbal is stationary.

12. The non-transitory computer-readable storage medium of claim 11, further including instructions that when executed cause the processor to perform operations including:
    responsive to determining the rotating platform is stationary, adjusting the angular velocity of the motor of the gimbal to reduce the first difference.

13. The non-transitory computer-readable storage medium of claim 11, further including instructions that when executed cause the processor to perform operations including:
    responsive to determining the rotating platform is not stationary, decelerating the rotating platform and adjusting the angular velocity of the motor of the gimbal to reduce an offset between the angular velocity of the motor of the gimbal and the target angular velocity of the camera.

14. The non-transitory computer-readable storage medium of claim 11, further including instructions that when executed cause the processor to perform operations including:
    summing the angular velocity of the motor of the gimbal and the first difference to generate a combined angular velocity;
    comparing the combined angular velocity to the threshold;

responsive to the combined angular velocity being above the threshold, adjusting the angular velocity of a motor of the rotating platform to reduce the first difference; and responsive to the combined angular velocity being below the threshold, adjusting the angular velocity of the motor of the gimbal to reduce the first difference.

15. The non-transitory computer-readable storage medium of claim 11, further including instructions that when executed cause the processor to perform operations including:

detecting a first angular position and a second angular position of an object relative to an orientation of the camera, the first angular position detected at a first time and the second angular position detected at a second time;

determining an angular velocity of the object based on the first angular position, the second angular position, the first time, and the second time; and adjusting the angular velocity of the motor of the rotating platform to reduce a second difference between an angular velocity of the rotating platform and the angular velocity of the object.

16. The non-transitory computer-readable storage medium of claim 15, further including instructions that when executed cause the processor to perform operations including:

determining a target angular position of the motor of the gimbal based on an angular position of the motor of the gimbal, the second angular position of the object, and an angular position of the camera; and adjusting the angular position of the motor of the gimbal to reduce a difference between the angular position of the motor of the gimbal and the target angular position of the motor.

17. A camera system, comprising:
an imaging device;
a gimbal coupled to the imaging device;
a rotating platform coupled to the gimbal;
a processor; and
a memory coupled to the processor, wherein the memory includes instructions executable by the processor to cause the processor to:

determine a variance velocity between a camera velocity and a target velocity;

compare the variance velocity to a threshold velocity; and responsive to the variance velocity not exceeding the threshold velocity, adjust a velocity of a motor of the gimbal to reduce the variance velocity.

18. The camera system of claim 17, further comprising:
a rotating platform coupled to the gimbal, wherein the memory further includes instructions executable by the processor to cause the processor to:

responsive to the variance velocity exceeding the threshold velocity, adjust a velocity of a motor of the rotating platform to reduce the variance velocity.

19. The camera system of claim 18, wherein the memory further includes instructions executable by the processor to cause the processor to:

responsive to the variance velocity not exceeding the threshold velocity, determine if the rotating platform is stationary;

responsive to the rotating platform being stationary, adjust the velocity of the motor of the gimbal to reduce the variance velocity; and responsive to the rotating platform not being stationary, decelerate the rotating platform and adjust the velocity of the motor of the gimbal to reduce an offset between the velocity of the motor of the gimbal and the target velocity.

20. The camera system of claim 17, wherein the target velocity is suitable for tracking an object.

* * * * *